United States Patent
Park et al.

(10) Patent No.: US 10,820,002 B2
(45) Date of Patent: Oct. 27, 2020

(54) IMAGE ENCODING APPARATUS AND IMAGE DECODING APPARATUS AND METHOD OF OPERATING THE SAME

(71) Applicant: SAMSUNG ELECTRONICS CO., LTD., Suwon-si (KR)

(72) Inventors: Min-woo Park, Yongin-si (KR); In-kwon Choi, Seongnam-si (KR); Chan-yul Kim, Bucheon-si (KR); Kwang-pyo Choi, Anyang-si (KR); Seung-soo Jeong, Seoul (KR)

(73) Assignee: SAMSUNG ELECTRONICS CO., LTD., Suwon-si (KP)

( * ) Notice: Subject to any disclaimer, the term of this patent is extended or adjusted under 35 U.S.C. 154(b) by 471 days.

(21) Appl. No.: 14/965,348

(22) Filed: Dec. 10, 2015

(65) Prior Publication Data
US 2016/0173910 A1    Jun. 16, 2016

(30) Foreign Application Priority Data

Dec. 10, 2014    (KR) .................. 10-2014-0177879
Sep. 24, 2015    (KR) .................. 10-2015-0135552

(51) Int. Cl.
*H04N 19/463* (2014.01)
*H04N 19/40* (2014.01)

(52) U.S. Cl.
CPC .......... *H04N 19/463* (2014.11); *H04N 19/40* (2014.11)

(58) Field of Classification Search
None
See application file for complete search history.

(56) References Cited

U.S. PATENT DOCUMENTS

| 5,987,182 | A | * | 11/1999 | Kimura | G06T 9/00 382/238 |
| 6,175,663 | B1 | * | 1/2001 | Huang | G06T 11/60 345/589 |
| 6,603,864 | B1 | * | 8/2003 | Matsunoshita | G06T 1/0028 382/100 |
| 7,676,056 | B2 | | 3/2010 | Chiba et al. | |
| 7,948,659 | B2 | * | 5/2011 | Shibuya | H04N 1/4072 358/1.9 |
| 8,933,929 | B1 | * | 1/2015 | Filip | G06K 9/32 345/419 |
| 2001/0016829 | A1 | * | 8/2001 | Toshikage | G06Q 20/1235 705/51 |
| 2003/0065675 | A1 | * | 4/2003 | Gritzbach | G06F 17/30017 |
| 2007/0046706 | A1 | * | 3/2007 | Kayahara | B41J 2/2128 347/14 |

(Continued)

FOREIGN PATENT DOCUMENTS

WO    WO 2011103258 A2 *    8/2011 ........... G11B 27/031

*Primary Examiner* — Bernard Krasnic
(74) *Attorney, Agent, or Firm* — Sughrue Mion, PLLC

(57) ABSTRACT

An image encoding apparatus includes an annexed data obtainer configured to obtain annexed data that is annexed to image data and that is to be transmitted along with the image data; an annexed image data obtainer configured to convert the obtained annexed data and obtain annexed image data having a same format as that of the image data; and an encoder configured to obtain transmission image data based on the annexed image data and the image data and encode the transmission image data according to a first codec.

30 Claims, 27 Drawing Sheets

(56) References Cited

U.S. PATENT DOCUMENTS

| | | | |
|---|---|---|---|
| 2007/0103730 A1* | 5/2007 | Yasutomi | H04N 1/4058 358/3.2 |
| 2007/0220173 A1* | 9/2007 | Ohga | G06Q 30/00 709/250 |
| 2009/0010570 A1* | 1/2009 | Yamada | G06K 9/00221 382/312 |
| 2009/0190184 A1* | 7/2009 | Jingu | H04N 1/32133 358/444 |
| 2009/0262991 A1* | 10/2009 | Thiagarajan | H04N 21/234327 382/128 |
| 2010/0080476 A1* | 4/2010 | Khorasani | G06F 19/321 382/235 |
| 2010/0091331 A1* | 4/2010 | Kawamura | H04N 1/4052 358/3.01 |
| 2013/0346450 A1* | 12/2013 | Procopio | G06F 21/6218 707/783 |
| 2015/0104147 A1* | 4/2015 | Kosaka | G06F 17/30784 386/239 |

* cited by examiner

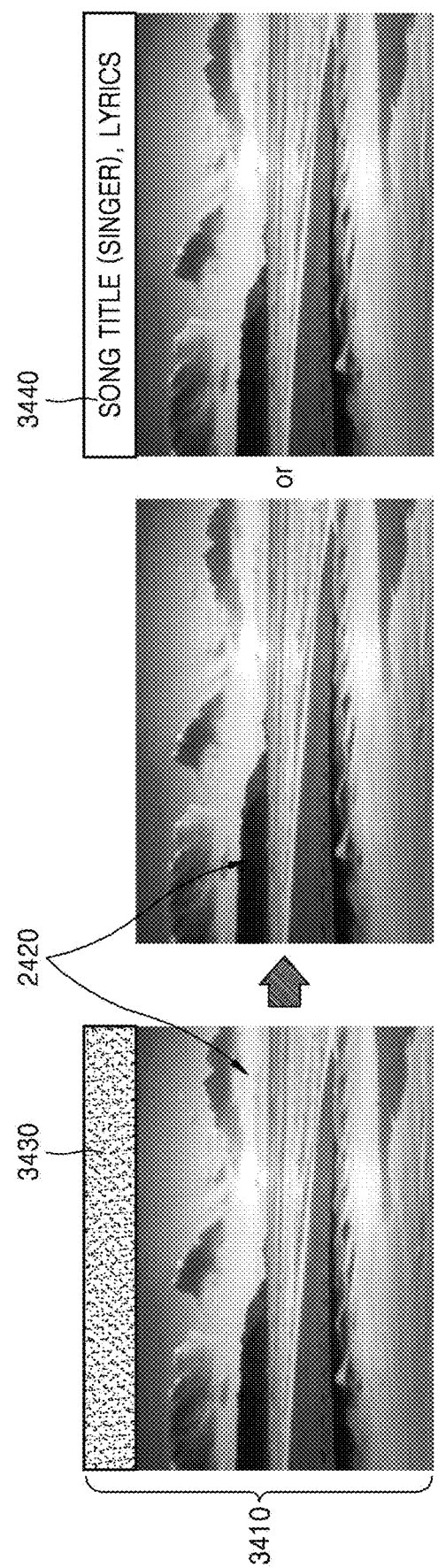

IMAGE ENCODING APPARATUS AND IMAGE DECODING APPARATUS AND METHOD OF OPERATING THE SAME

CROSS-REFERENCE TO RELATED APPLICATION

This application claims priority from Korean Patent Application No. 10-2014-0177879, filed on Dec. 10, 2014, and Korean Patent Application No. 10-2015-0135552, filed on Sep. 24, 2015, in the Korean Intellectual Property Office, the disclosures of which are incorporated herein in their entirety by reference.

BACKGROUND

1. Field

Apparatuses and methods consistent with exemplary embodiments relate to image processing, and more particularly, to image processing for transmitting an image file without a loss of image data or annexed data.

2. Related Art

In general, in the case of the Joint Photographic Experts Group (JPEG) image compression standard, various types of annexed data annexed to images may be inserted into a header in order to transmit image data and the annexed data together. A loss of the annexed data may occur when image files are transcoded. In more detail, the loss of the annexed data included in the header of a JPEG file format may occur, and a loss of annexed data stored in images may also occur due to a quantization error caused by a change in a quantization parameter and a color space conversion that may also be performed. Thus, there is demand for a technology for preserving the annexed data, when image files are transcoded.

Because of the popularity of smart devices such as a smart phones, the sending and receiving image files through a multimedia messaging server (MMS) or various instant messaging services (IMSs) has been recently increasing. Thus, image files are frequently transmitted through transcoding, for example by adjusting an image resolution in consideration of a transmission bandwidth or reducing a data size by changing a quantization parameter. Therefore, the importance of a technology of transmitting data annexed to images without losing the annexed data is increasing.

SUMMARY

Provided are apparatuses and methods of inserting annexed data into image data and apparatuses and methods of extracting annexed data from image data. Methods of converting annexed data into an image data format by recording the annexed data on an annexed data block are also provided. In addition, non-transitory computer-readable recording media having recorded thereon a computer program for executing a method of inserting annexed data or a method of extracting annexed data are provided.

Additional aspects will be set forth in part in the description which follows and, in part, will be apparent from the description, or may be learned by practice of the presented exemplary embodiments.

According to an aspect of an exemplary embodiment, an image encoding apparatus includes an annexed data obtainer configured to obtain annexed data that is annexed to image data and that is to be transmitted along with the image data; an annexed image data obtainer configured to convert the obtained annexed data and obtain annexed image data having a same format as that of the image data; and an encoder configured to obtain transmission image data based on the annexed image data and the image data and encode the transmission image data according to a first codec.

The annexed data may include image processing data configured to convert the image data, the image encoding apparatus may further include: an image processor configured to process the image data according to the image processing data.

The annexed data obtainer may obtain the annexed data from an image file including the image data.

When the image data of the image file and the annexed data are encoded in the first codec, the annexed data obtainer may obtain the annexed data by decoding, in the first codec, the annexed data encoded in the first codec, and wherein the encoder encodes the annexed image data converted from the annexed data in the first codec and obtains the transmission image data encoded in the first codec by using the annexed image data encoded in the first codec and the image data encoded in the first codec.

The image encoding apparatus may further include: when the image data of the image file and the annexed data are encoded in a second codec, a decoder configured to decode the image data and the annexed data in the second codec.

The annexed data obtainer may obtain the annexed data including at least one of an annexed data identifier inserted into the annexed data and annexed image conversion information regarding a method of converting the annexed data into the annexed image data in order to distinguish the annexed data from the image data.

When there is an image size limitation with respect to the transmission image data, the annexed image data obtainer may compress the annexed data according to the image size limitation, convert the compressed annexed data, and obtain the annexed image data.

According to an aspect of another exemplary embodiment, an image decoding apparatus includes: a bitstream receiver configured to receive a bitstream including encoded transmission image data encoded in a first codec; an annexed image data obtainer configured to obtain transmission image data by decoding the encoded transmission image data in the first codec and to obtain annexed image data from the transmission image data; and an annexed data obtainer configured to obtain annexed data by converting the obtained annexed image data, wherein the transmission image data is obtained based on image data and the annexed image data, the annexed imaged data is obtained by converting the annexed data to have a same format as that of the image data, and the annexed data is annexed to the image data.

The annexed data may include image processing information configured to convert the image data, the image decoding apparatus further includes: an image processor configured to process the image data according to the image processing information.

The image decoding apparatus may further include: an image file reconstructor configured to obtain the image data from the transmission image data and reconstruct an image file including the image data and the annexed data by using the image data and the annexed data.

According to an aspect of another exemplary embodiment, an image encoding method includes obtaining annexed data that is annexed to image data and transmitted along with the image data; converting the obtained annexed data and obtaining annexed image data having a same format as that of the image data; and obtaining transmission image data based on the annexed image data and the image data and encoding the transmission image data in a first codec.

The annexed data may include image processing data configured to convert the image data, the image encoding method further includes: processing the image data according to the image processing data.

The obtaining of the annexed data may include: obtaining the annexed data from an image file including the image data.

When the image data of the image file and the annexed data are encoded in the first codec, the obtaining of the annexed data may include obtaining the annexed data by decoding, in the first codec, the annexed data encoded in the first codec, and wherein the encoding includes: encoding the transmission image data by encoding, in the first codec, a part of the transmission image data corresponding to the annexed image data that is not encoded in the first codec.

The image encoding method may further include: when the image data of the image file and the annexed data are encoded in a second codec, decoding the image data and the annexed data in the second codec.

The obtaining of the annexed data may include: obtaining the annexed data including at least one of an annexed data identifier inserted into the annexed data and annexed image conversion information regarding a method of converting the annexed data into the annexed image data in order to distinguish the annexed data from the image data.

When there is an image size limitation of the transmission image data, the obtaining of the transmission image data may include: compressing the annexed data according to the image size limitation, converting the compressed annexed data, and obtaining the annexed image data.

According to an aspect of another exemplary embodiment, an image decoding method includes receiving a bitstream including encoded transmission image data encoded in a first codec; obtaining transmission image data by decoding the encoded transmission image data in the first codec and obtaining annexed image data from the transmission image data; and obtaining annexed data by converting the obtained annexed image data, wherein the transmission image data is obtained based on the image data and the annexed image data, the annexed imaged data is obtained by converting the annexed data to have a same format as that of the image data, and the annexed data is annexed to the image data.

The annexed data may include image processing information configured to convert the image data, the image decoding method further includes: processing the image data according to the image processing information.

The image decoding method may further include: obtaining the image data from the transmission image data and reconstructing an image file including the image data and the annexed data by using the image data and the annexed data.

According to an aspect of another exemplary embodiment, there is a non-transitory computer-readable recording medium having recorded thereon a computer program for performing the image encoding methods.

According to an aspect of another exemplary embodiment, there is a non-transitory computer-readable recording medium having recorded thereon a computer program for performing the image decoding methods.

BRIEF DESCRIPTION OF THE DRAWINGS

These and/or other aspects will become apparent and more readily appreciated from the following description of the exemplary embodiments, taken in conjunction with the accompanying drawings in which:

FIG. 34 is a diagram for describing an exemplary embodiment of hiding annexed image data of a transmission image and displaying information regarding image data on a location of the annexed image data.

DETAILED DESCRIPTION OF EXEMPLARY EMBODIMENTS

Exemplary embodiments are described with reference to the accompanying drawings. It should be understood that exemplary embodiments described below are provided for purposes of explanation and not for limiting the spirit and scope of the inventive concept. Features or aspects may easily inferred by a person of ordinary skill in the art from detailed descriptions and exemplary embodiments are included in the scope as defined by the claims.

A codec is an apparatus or software that encodes image data into a specific image file format or decodes data of the specific image file format into the image data.

A bitstream is a bitstring consecutively transmitted through a serial communication line one bit at a time. Image data is transmitted through a transmission channel in a bitstream format.

Figure 1:
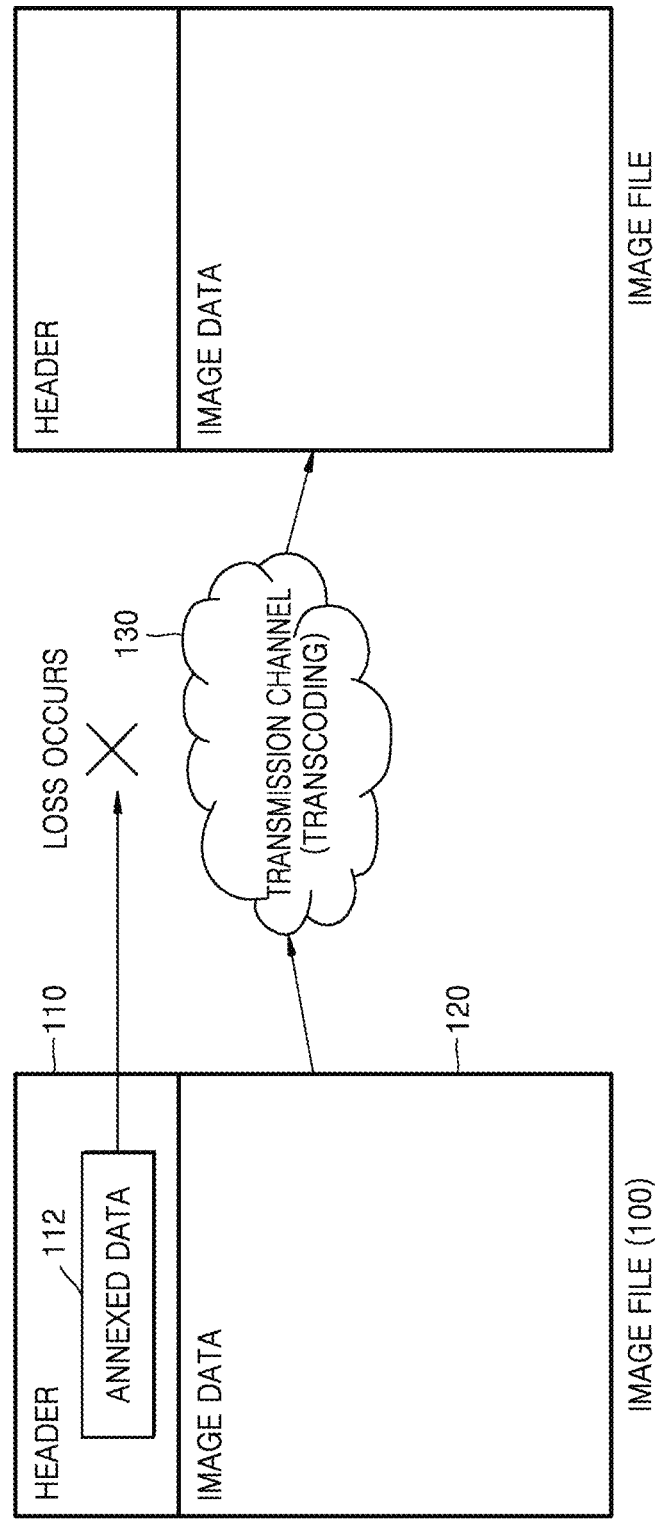
FIG. 1 is a diagram for describing a loss of annexed data that occurs when an image file is transmitted through a transmission channel.

FIG. 1 is a diagram for describing a loss of annexed data 112 that occurs when an image file 100 is transmitted through a transmission channel 130.

In FIG. 1, the image file 100 may be encoded in the JPEG, the GIF, and the PNG formats. The image file 100 may include a header 110 and image data 120. The header 110 may include the annexed data 112 that is annexed to images. The annexed data 112 may include image related information such as a capacity of the image file 100, a creation date, a size, image processing information, a thumbnail image, feature information, phase information, image format information, rotation information, bitdepth information, scramble key information when an image is scrambled, encoding key information when the image is expressed in an encoding format, encoding information, etc. The annexed data 112 may include data that is not directly related to an encoded image such as tag information of a user, voice data, audio data, music data, animation data, video data, icon data, interaction information, user authentication information, location information, date information, weather information, contact number information, user personal information, image link information, a uniform resource locator (URL), a uniform resource identifier (URI), an Internet protocol (IP), an e-mail address, various types of multimedia data, data in a specific file format (for example, MP4, ISO file format, etc.), data in an EXIF format, data in a JFIF format, bio information, text data, e-book data, font information, annexed image data mode information, information regarding a method of obtaining annexed image data, a method of interpreting the annexed image data, and information (for example, the Huffman code table and a quantization table) used to perform annexed image encoding. That is, the annexed data 112 stored in the header 110 may or may not necessarily be closely related to images. When transcoding is included during a process of transmitting the image file 100 through the transmission channel 130, a loss of the annexed data 112 located in the header 110 may occur since the header 110 is newly coded, and thus only the image data 120 may be transmitted. Therefore, a technology of preventing the loss of the annexed data 112 even when transcoding is included during the process of transmitting the image file 100 is required.

Although the annexed data 112 is stored in the header 110 of the image file 100 in FIG. 1, the annexed data 112 may be present in another partition (for example, a tail area or a specific marker code area, etc.) of the image file 100 according to exemplary embodiments.

Figure 2:
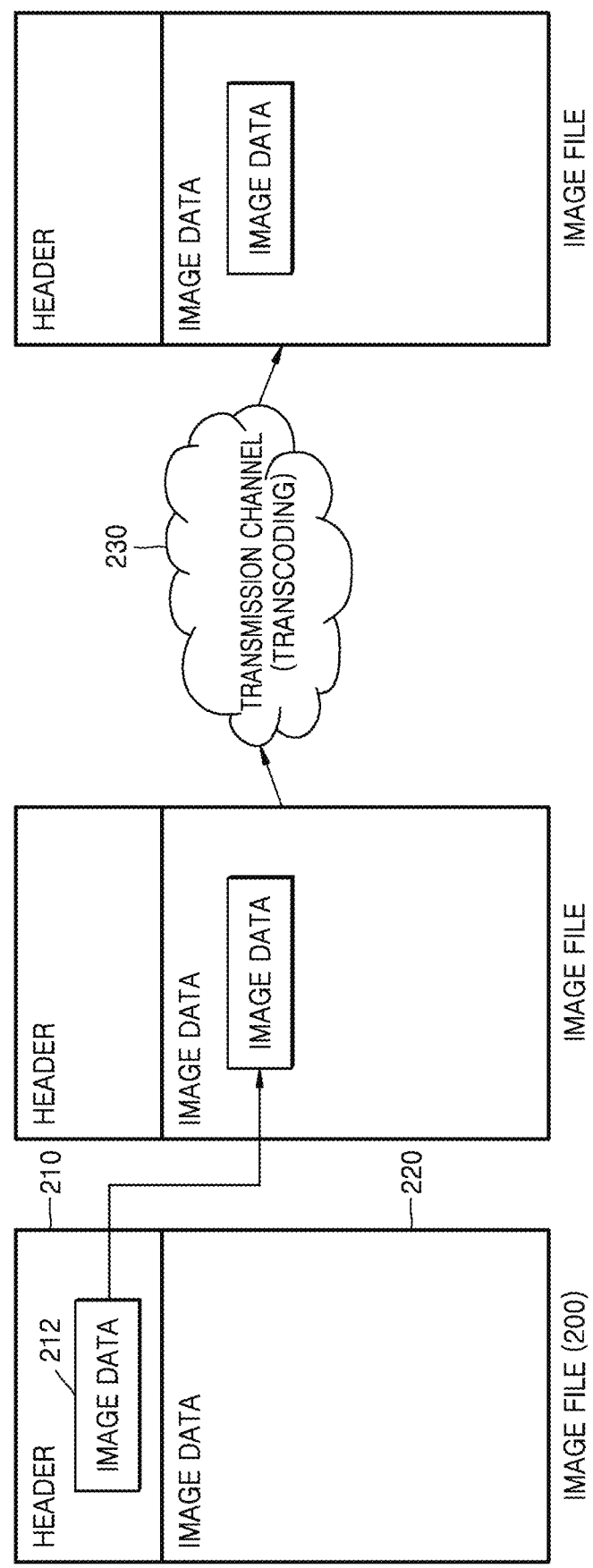
FIG. 2 is a diagram for describing a method of preventing a loss of annexed data that occurs when an image file is transmitted through a transmission channel.

FIG. 2 is a diagram for describing a method of preventing a loss of annexed data 212 that occurs when an image file 200 is transmitted through a transmission channel 230.

In FIG. 2, since a loss of the image data 220 may not be recognized by a user even when the image file 200 is transmitted through the transmission channel 230, the annexed data 212 included in a header 210 may be converted into an image of the same format as that of the image data 220, and the converted annexed data 212 may be combined or mixed with the image data 220. As such, the annexed data 212 may be transcoded and may be transmitted, along with the image data 220, through the transmission channel 230. Thus, the loss of the annexed data 212 may not occur during a process of transmitting the image file 200 through the transmission channel 230 that is transcoded (since the annexed data 212 is converted into annexed image data in consideration of the transmission channel 230 that is transcoded).

Figure 3:
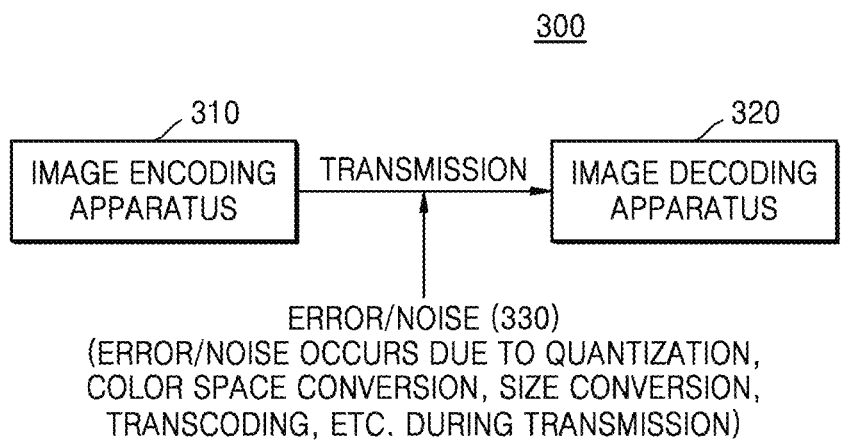
FIG. 3 is a diagram for describing an annexed data transmission system according to an exemplary embodiment.

FIG. 3 is a diagram for describing an annexed data transmission system 300 according to an exemplary embodiment.

In FIG. 3, the annexed data transmission system 300 for transmitting an image file without a loss of annexed data is illustrated. The annexed data transmission system 300 may include an image encoding apparatus 310 and an image decoding apparatus 320. The image file may be transmitted from the image encoding apparatus 310 to the image decoding apparatus 320. Error/noise 330 may occur during a transmission of the image file. The error/noise 330 may include an error or noise due to quantization, color space conversion, size conversion, transcoding, or a transmission channel, etc. As described above, the loss of the annexed data may occur due to transcoding, and the loss or modification of annexed data may occur due to quantization, color space conversion, size conversion, etc.

Figure 4:
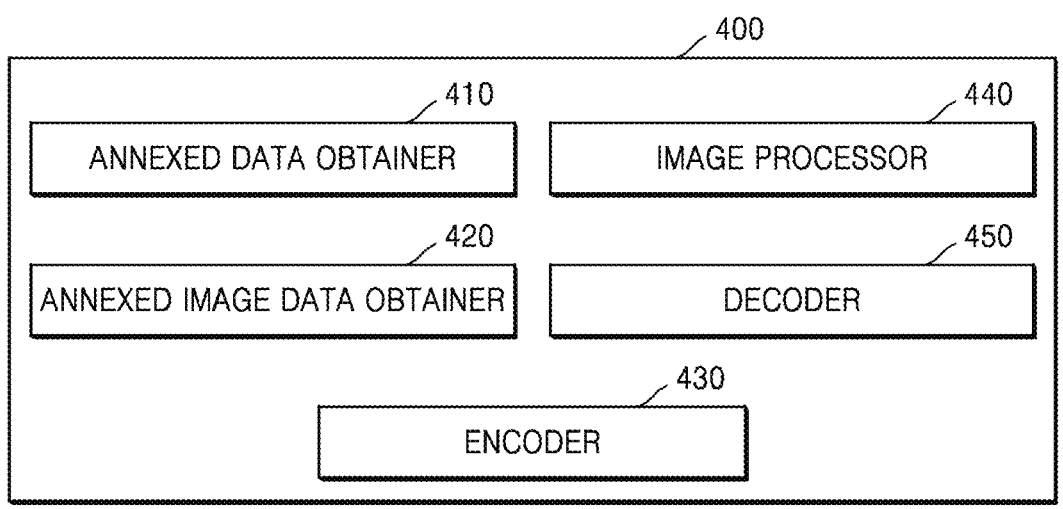
FIG. 4 is a diagram for describing an image encoding apparatus according to an exemplary embodiment.
Figure 5:
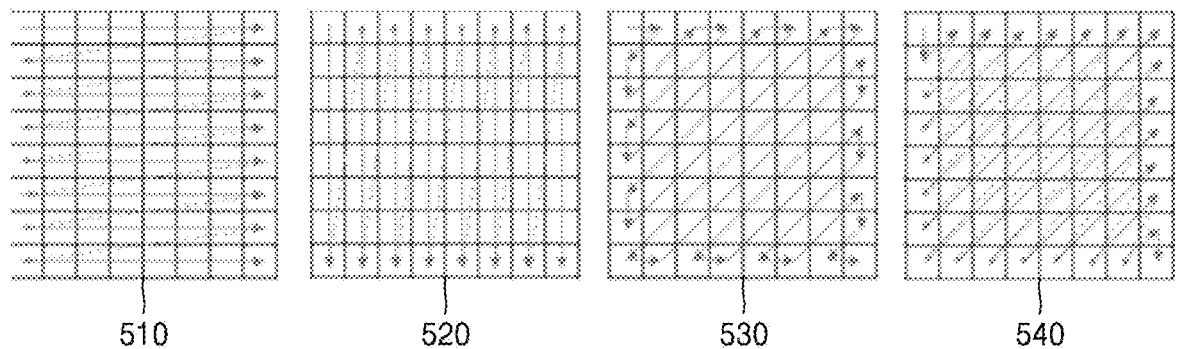
FIG. 5 is a diagram of a data insertion sequence according to an exemplary embodiment.

FIG. 4 is a diagram for describing an image encoding apparatus 400 according to an exemplary embodiment.

The image encoding apparatus 400 may include an annexed data obtainer 410, an annexed image data obtainer 420, an encoder 430, an image processor 440, and a decoder 450.

The annexed data obtainer 410 may obtain annexed data from an image file. When the annexed data is included in a header of the image file, the annexed data obtainer 410 may obtain the annexed data from the header of the image file. If the annexed data is stored in a partition other than the header of the image file, the annexed data obtainer 410 may obtain the annexed data stored in the partition of the image file. For example, the annexed data may be included in the middle or back of image data. In more detail, for example, the annexed data may be included in the front or back of a maker code that is used to distinguish data in a JPEG format file. The annexed data may include a specific marker code itself.

The annexed data obtainer 410 may obtain the annexed data from the outside of the image file. For example, the annexed data obtainer 410 may obtain the annexed data generated during an image encoding process, like information necessary for image encoding and decoding. In addition, the annexed data obtainer 410 may obtain all types of annexed data that needs to be transmitted along with images.

The annexed data obtainer 410 may decode the annexed data when the annexed data obtained from the image file is encoded.

The annexed data obtained by the annexed data obtainer 410 may include all types of information that is annexed to images. For example, the annexed data may include tag information of a user, voice data, audio data, music data, video data, text data, icon data, drawing data, graphic data, animation data, font data, alpha map data indicating transparency of images, depth map data, a thumbnail image of image data that is to be encoded, specific media data encoded in a specific format (for example, PNG, GIF, MP3, etc.) and user authentication information. The annexed data may include scramble key information when image data is scrambled, scrambling information, encoding key information when images are expressed in an encoding format, and encoding information, etc. The annexed information may include various image processing information, location information such as a GPS, date information, weather information, image forming information, phase information of the image data, image format information, image rotation information, image size information, image bitdepth information, image abstract information (for example, an image feature, etc.), various user personal information (phone numbers, e-mail addresses, addresses, etc.), user interaction information, user tag information, user messages, user notes, hyperlinks, connection information (URL and URI), bio information, data in a specific file format (for example, MP4, ISO file format, etc.), data in an EXIF format, and data in a JFIF format. The annexed data may include data regarding users who are authorized to access images. In addition, the annexed information may include information regarding a method necessary for converting the annexed data into annexed image data, a method of interpreting the annexed image data, and information (for example, the Huffman code table and a quantization table) used to perform image encoding, which will be described later.

The annexed data obtainer 410 may include an identifier indicating that data is the annexed data in the annexed data. The identifier may be implemented using various methods such as a start code, etc. The annexed data obtainer 410 may include information regarding image use authority in the annexed data. The image use authority may refer to authority regarding transmitting of images, receiving, correcting, printing, etc. The image use authority may be separately set with respect to image functions. The information regarding the image use authority may be obtained from a database stored in the outside of the image file. However, the information regarding the image use authority may be stored in the image file according to exemplary embodiments.

The annexed data obtainer 410 may obtain user authentication information indicating users who are authorized to access the annexed data. The annexed data obtainer 410 may determine a multimedia reproduction apparatus that may use the annexed data according to a user input. The annexed data obtainer 410 may generate user authentication information including information regarding the multimedia reproduction apparatus allowed to use the annexed data. As another example, the annexed data obtainer 410 may obtain previously generated user authentication information. The authentication information may be one or more of a user password, key, certificate, etc.

The multimedia reproduction apparatus allowed to use the annexed data may be determined using various methods. For example, the multimedia reproduction apparatus may be determined based on an apparatus identifier of the multimedia reproduction apparatus. As another example, the multimedia reproduction apparatus may be determined based on an identifier of a user who uses the multimedia reproduction apparatus.

The user authentication information may include a range of the annexed data allowed to be accessed or used by the multimedia reproduction apparatus. For example, the image conversion information of the annexed data may be activated by all multimedia reproduction apparatuses, and only the audio data may be reproduced by a specific multimedia reproduction apparatus indicated by the user authentication information.

Multimedia reproduction apparatuses may have different ranges of the annexed data. For example, when the annexed data includes the audio data and the text data, the range of the annexed data may be determined such that a first multimedia reproduction apparatus may reproduce only the audio data and a second multimedia reproduction apparatus may reproduce only the text data.

The user authentication information may include a multimedia reproduction apparatus that may not use the annexed data. For example, the annexed data obtainer 410 may set the user authentication information in which the annexed data is not allowed to be accessed or used by a specific multimedia reproduction apparatus and is allowed to be accessed or used by multimedia reproduction apparatuses except for the specific multimedia reproduction apparatus.

The annexed image data obtainer 420 may convert the annexed data obtained by the annexed data obtainer 410 into images having the same format as that of the image data and obtain the annexed image data.

The annexed image data obtainer 420 may convert the annexed data into a predetermined format before the annexed data is converted into the annexed image data. The predetermined format may be configured as a data code informing a start of the annexed data, a data code indicating whether the annexed image data is present in transmission image data, insertion pattern information of the annexed image data, a data type of the annexed data, a data size of the annexed data, content of the annexed data, etc. in a sequence.

The annexed image data obtainer 420 may compress the annexed data before the annexed data is converted into the annexed image. For example, when there is an image size limitation, the annexed image data obtainer 420 may compress the annexed data such that an image size corresponding to the annexed image data and the image data is smaller than the image size limitation.

The annexed image data obtainer 420 may encode the annexed data using a predetermined method before the annexed data is converted into the annexed image. For example, when the annexed data includes personal information of a creator or a user of the image file, the annexed image data obtainer 420 may encode the personal information.

The annexed image data obtainer 420 may combine the annexed data and optional data, convert the combined data in images having the same format as that of the image data, and obtain the annexed image data. In this regard, the optional data may mean data including randomly determined values. Thus, the optional data may not include meaningful information. However, since the optional data is imaged along with the annexed data, when a loss of the transmission image data that will be described later occurs during transmission, a loss of the annexed data may be reduced.

A method of obtaining the annexed image data based on the annexed data will be described later with reference to FIGS. 5 through 13.

The encoder 430 may obtain the transmission image data based on the annexed image data obtained by the annexed data obtainer 410 and the image data of the image file, encode the obtained transmission image data in a first codec, and obtain a bitstream including the encoded transmission image data.

When the transmission image data is obtained in a pixel domain, encoding may be performed on the entire transmission image data. When the annexed image data is obtained in a transform domain, encoding may be performed after a specific process. For example, when a first codec encoding process is configured as a first encoding operation and a second encoding operation, and the annexed image data is inserted into or combined with images corresponding to the image data after the first encoding operation is performed, only the second encoding operation may be performed to complete the first codec encoding process.

In this regard, when decoding is performed on the bitstream including the encoded transmission image data by using a general image decoder, the transmission image data that is a combination of the images corresponding to the image data and the annexed image data may be output.

The image processor 440 may process the image data according to image conversion data included in the annexed data before the encoder 430 obtains the transmission image data.

The image processor 440 may process the image data in consideration of a transmission channel environment. For example, when there is a size limitation to the transmission image data that may be transmitted through a transmission channel, the image processor 440 may reduce a size of the image data such that the transmission image data may pass through the transmission channel. As another example, the image processor 440 may convert a color format of the image data such that the image data may have a color format appropriate to the transmission channel environment. As a specific example, if the transmission channel supports only a YCBCR 4:2:0 color format, and a color format of currently input image data is RGB, CMY, CMYK, RGBA, YCBCR 4:4:4, YCBCR 4:2:2, or YCBCR 4:0:0, the image processor 440 may convert the color format of the image data into the YCBCR 4:2:0 color format.

If the image processor 440 performs image processing based on specific image processing information included in the annexed data, a result of processing the image data may be used as an input of the annexed data obtainer 410. For example, when the image data is scrambled based on the image processing information, a result of image scrambling may be transmitted to the annexed data obtainer 410. Thus, when the transmission image data is decoded, the image data may be reconstructed based on a result of image scrambling.

The image processing information of the annexed data may information induced by analyzing the image data. For example, the image processing information may be information obtained by analyzing the image data such that the transmission image data may pass through the transmission channel and processing the analyzed image data to be appropriate to the transmission channel environment.

The decoder 450 may decode the image file in a second codec when the image file is encoded in the second codec other than the first codec used by the encoder 430.

The image data may be encoded in the second codec that is incompatible with the first codec used by the encoder 430. Thus, the decoder 450 may decode the image data in the second codec such that the encoder 430 may encode the image data in the first codec.

The decoder 450 may transcode the image data to convert the image data encoded in the second codec into the image data encoded in the first codec. For example, when the image data is a PNG format, and a compatible codec in the encoder 430 is a JPEG format, the decoder 450 may convert image data encoded in the PNG format into image data encoded in the JPEG format.

FIGS. 5 through 13 provide exemplary embodiments of a method of obtaining annexed image data by converting annexed data.

An annexed image data obtainer may determine an annexed data insertion sequence. The annexed image data obtainer may insert the annexed data in a pixel unit. The annexed image data obtainer may insert the annexed data into a specific block size unit configured as pixels in the annexed data insertion sequence. For example, when the annexed data is inserted into an 8×8 pixel block in the JPEG, the annexed image data obtainer may insert data from left pixels to right pixels from upper rows to lower rows, like as shown with respect to a block 510. As another example, the annexed image data obtainer may insert data from upper pixels to lower pixels from left rows to right rows, like as shown with respect to a block 520.

As another example, the annexed image data obtainer may insert data into pixels by changing directions diagonally, like as shown with respect to a block 530. To the contrary, the annexed image data obtainer may insert data into pixels in same directions diagonally, like as shown with respect to a block 540. The annexed image data obtainer may sequentially insert the annexed data into pixels included in a block in a different way from described in the exemplary embodiment of FIG. 5. The annexed image data obtainer may apply the same insertion sequence to blocks and may alternate insertion sequences between blocks. The annexed image data obtainer may insert the annexed data in an image unit irrespective of a block shape and size. However, in this case, an area into which the annexed data is inserted may be configured as a block unit that performs encoding.

Figure 6:
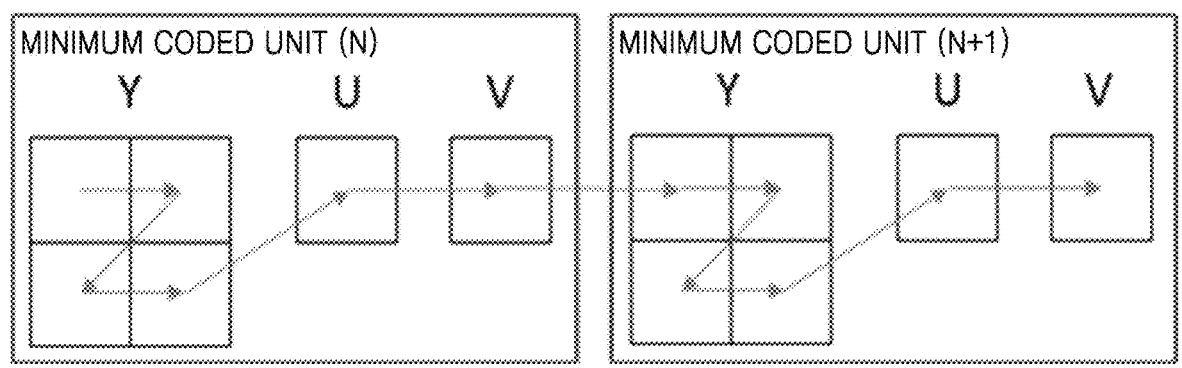
FIG. 6 is a diagram of a data insertion sequence according to another exemplary embodiment.

The annexed image data obtainer may determine the annexed data insertion sequence with respect to a coding unit of a predetermined codec after determining the annexed data insertion sequence of pixels included in a block. For example, when an encoder codes an image in a JPEG 4:2:0 format, the annexed image data obtainer may insert the annexed data in a coding sequence of the 8×8 pixel block. A minimum coded unit defined in the JPEG may be configured in a sequence of four 8×8 blocks with respect to a Y component, one 8×8 block with respect to a U component, and one 8×8 block with respect to a V component. In this regard, the annexed image data obtainer may insert the annexed data in a sequence as shown in FIG. 6. In FIG. 6, the annexed image data obtainer may sequentially insert the annexed data in the Y, U, and V components in a minimum coded unit N and then sequentially insert the annexed data in the Y, U, and V components in a minimum coded unit N+1.

Figure 7:
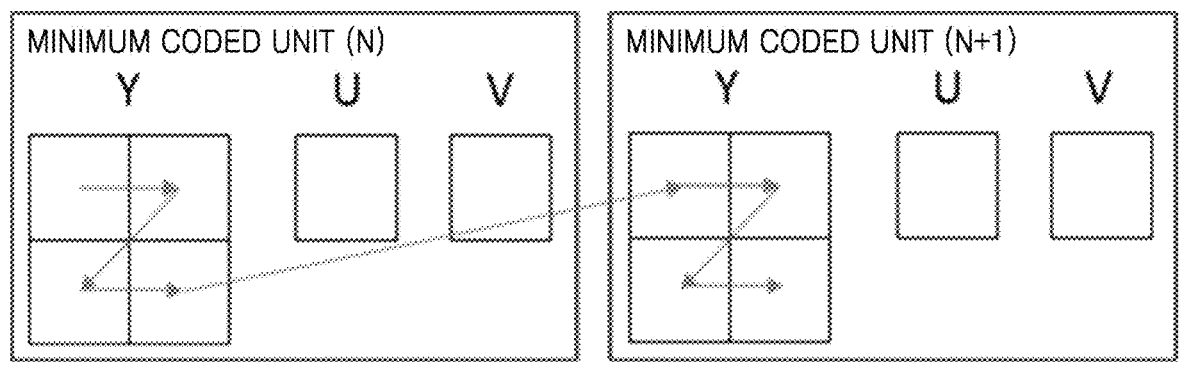
FIG. 7 is a diagram of a data insertion sequence according to another exemplary embodiment.

In FIG. 7, the annexed image data obtainer may insert the annexed data only with respect to the Y component. When transcoding is performed in a general transmission channel environment, a quantization unit may be large with respect to the U and V components (chroma components). Thus, when the annexed data is inserted on a basis of a pixel unit, a loss of the annexed data inserted into the U and V components may be highly possible. Thus, the annexed image data obtainer may insert the annexed data only with respect to the stable Y component in connection with quantization as shown in FIG. 7. In this regard, the annexed image data obtainer may fill the U and V components with certain values or optional values within a range in which the U and V components are not saturated during a color space conversion. For example, when the U and V components are fixed as a value of 128, each pixel may be expressed as a grey scale.

Figure 8:
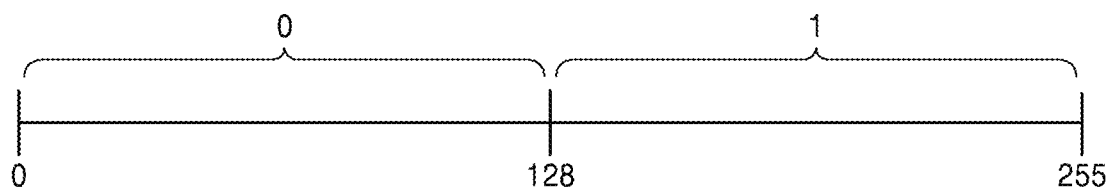
FIG. 8 is a diagram of a pixel unit data expression method according to an exemplary embodiment.

The annexed image data obtainer may determine an annexed data-image conversion table that defines a relationship between the annexed data and pixel values allocated to pixels of annexed images corresponding to the annexed image data. The annexed data may be converted into images in consideration of the transmission channel environment. For example, the annexed data may be expressed by splitting a range of pixel values into areas of a certain size and allocating the pixel values to the areas. For example, when the range of the pixel values (when pixels are expressed as 8 bits and have values from 0 to 255) are split into two ranges as shown in FIGS. 8 and 9, values of 0 and 1 may be allocated to the two ranges.

Figure 9:
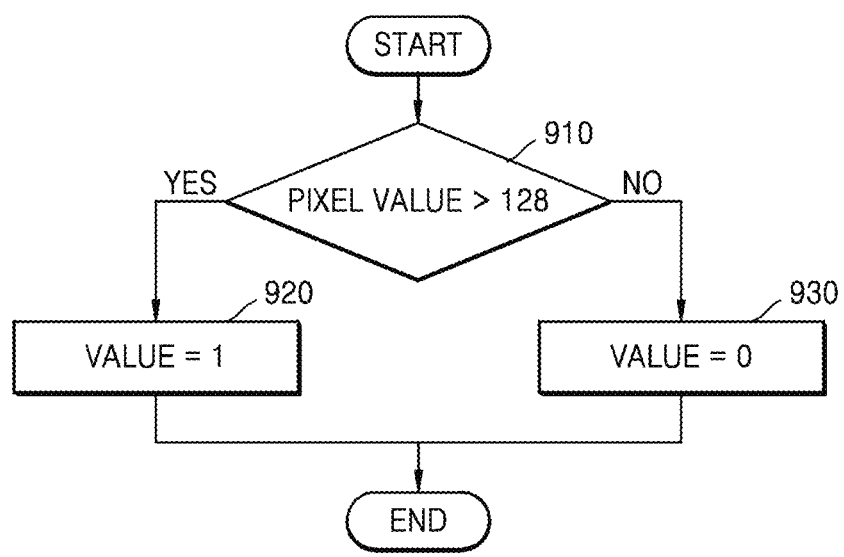
FIG. 9 is a flowchart of a pixel unit data expression method according to an exemplary embodiment.

In more detail, in operation 910 of FIG. 9, it may be determined whether a pixel value is greater than 128, and if the pixel value is greater than 128, in operation 920, the pixel value may be determined as 1, and, if the pixel value is not greater than 128, in operation 930, the pixel value may be determined as 0. As a result, one pixel value may be expressed as one bit. When the annexed data is inserted, the optional values may be set as fixed values, and the pixel values may have the fixed values. As an example of a method of setting the fixed values, when 0 is expressed, the fixed values may be set as 30, and, when 1 is expressed, the fixed values may be set as 255. As another example, when four values are expressed on a basis of a pixel unit, the range of the pixel values may be split into four ranges. In this case, one pixel value may be expressed as 2 bits. Likewise, one pixel value may be expressed as more than 3 bits by splitting the range of the pixel values into more than four areas.

The number of bits expressed in one pixel may be adaptively determined. For example, the number of bits may be determined according to a quantization parameter used to perform transcoding. In more detail, when the quantization parameter is large, since a big loss of image data due to transcoding occurs, the number of bits expressed in one pixel may be small. To the contrary, when the quantization parameter is small, since a small loss of image data due to transcoding occurs, the number of bits expressed in one pixel may be great.

An image conversion method may be determined based on pixel color information. When a current pixel is expressed using a YCBCR color model, the annexed data may be expressed as a combination of YCBCR (Y Cb Cr) components. In this case, the annexed data-image conversion table may be determined in consideration of a transmission channel. For example, the color space conversion may be considered during transcoding. As a specific example, YCBCR-RGB conversion and RGC-YCBCR conversion may be performed with respect to the JPEG, and thus the data conversion table may be designed in consideration of a point where the pixel values are saturated during the conversion.

Figure 11:
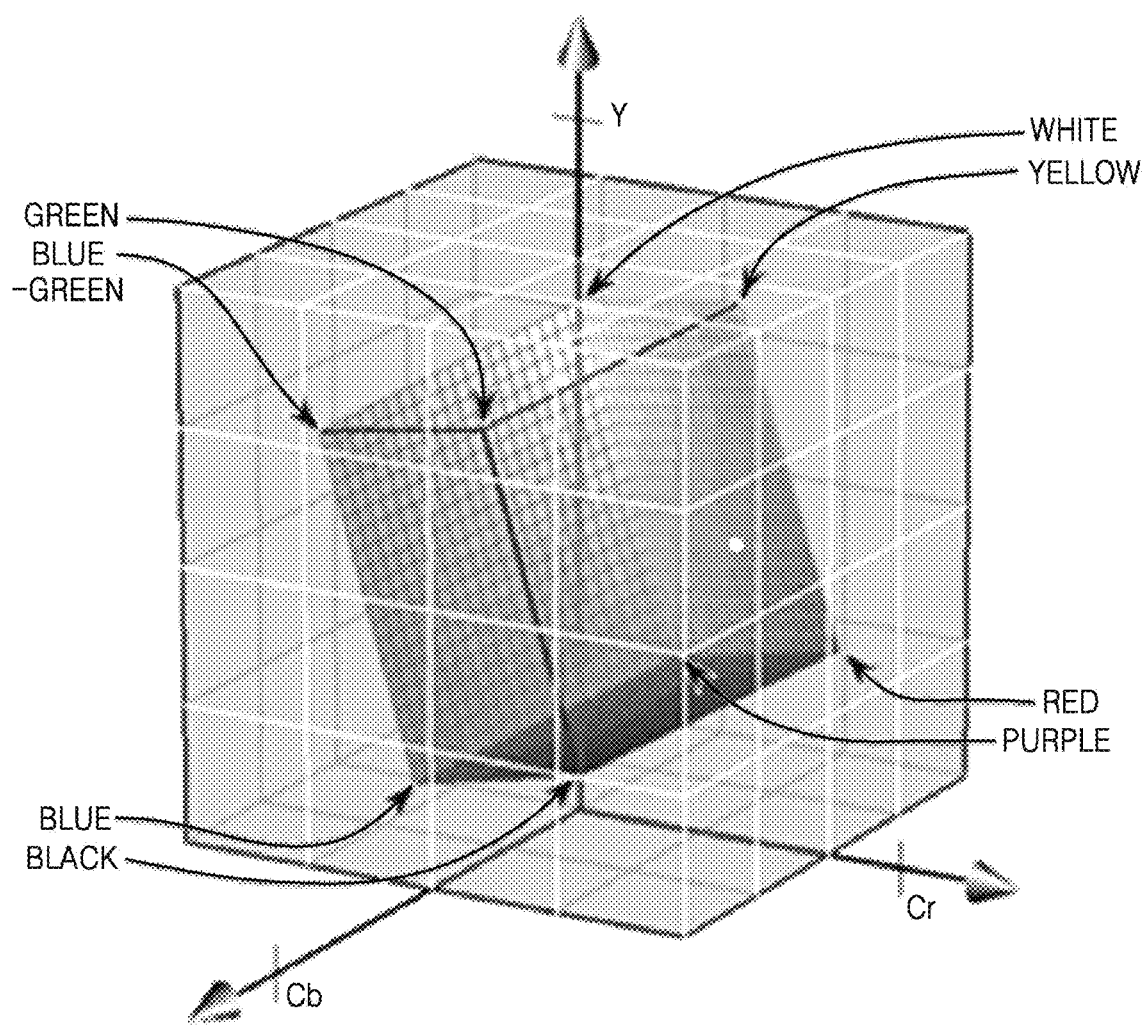
FIG. 11 is a diagram for describing a mapping relationship between a YCBCR color model and a RGB color model according to an exemplary embodiment.

FIG. 11 is a diagram for describing a mapping relationship between a YCBCR color model and a RGB color model according to an exemplary embodiment. During YCBCR-RGB conversion, an area, in a YCBCR space, converted into RGB space without saturation may be expressed in an internal cube in FIG. 11. The internal cube of FIG. 11 may be used to express the annexed data by matching N split areas of the internal cube to N values. For example, the internal cube may be split into eight areas, and bit values of the annexed data indicated by pixels may be determined as values allocated to areas in which the pixels are located. As a further specific example, a cube area may be split into eight areas in relation to a center of each corner, and thus eight small rectangular areas may be determined. Then, 3 bit values (from 000 to 111) may be allocated to the eight areas. When a pixel includes an area to which 010 is allocated, a pixel value of the pixel may be converted into 010 in the annexed data.

FIGS. 12A through 12D are diagrams for describing annexed data blocks inserted into image data according to exemplary embodiments.

Figure 12A:
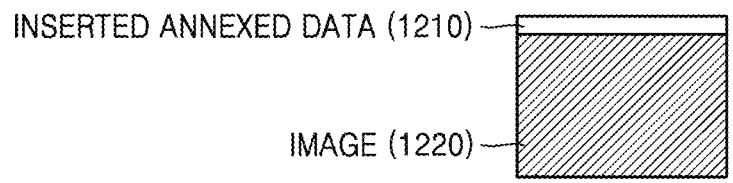
FIGS. 12A through 12D are diagrams for describing annexed data blocks inserted into image data according to exemplary embodiments.
Figure 12B:
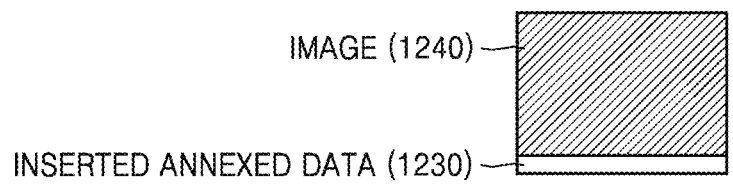
Figure 12C:
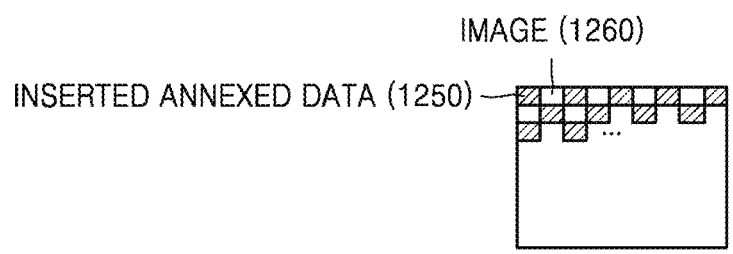
Figure 12D:
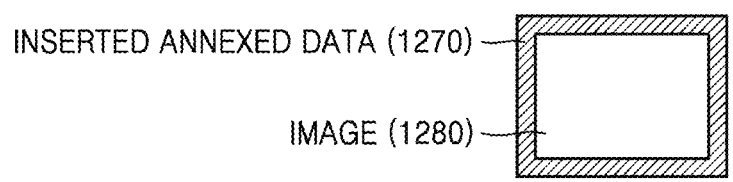

FIG. 12A shows transmission image data in which annexed image data 1210 is located in an upper end of an image 1220. FIG. 12B shows transmission image data in which inserted annexed image data 1230 is located in a lower end of an image 1240. FIG. 12C shows transmission image data in which blocks of a predetermined size split from inserted annexed image data 1250 are located in blocks of a predetermined size split from an image 1260. FIG. 12D shows transmission image data in which inserted annexed image data 1270 is located in the periphery of an image 1280. In addition to methods described with reference to FIGS. 12A through 12D, the annexed data may be inserted into images in various ways.

Figure 13:
FIG. 13 shows image data in which an annexed data block is inserted into an upper end of a JPEG image according to an exemplary embodiment.

FIG. 13 shows image data in which annexed image data is inserted into an upper end of a JPEG image according to an exemplary embodiment.

In the annexed image data of FIG. 13, Y components of pixels may have values corresponding to 1 bit in a pixel unit, and U and V components may have values within a range in which the U and V components are not saturated during a YCBCR-RGB conversion.

Figure 14:
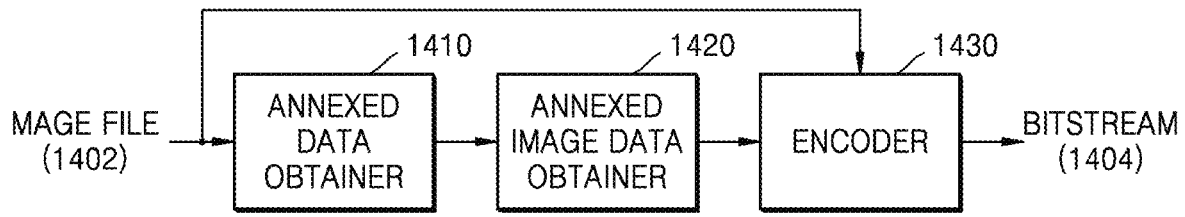
FIG. 14 is a diagram for describing an image encoding apparatus according to some exemplary embodiments.

FIG. 14 is a diagram for describing an image encoding apparatus according to some exemplary embodiments.

The image encoding apparatus 1400 of FIG. 14 may include an annexed data obtainer 1410, an annexed image data obtainer 1420, and an encoder 1430.

The annexed data obtainer 1410, the annexed image data obtainer 1420, and the encoder 1430 may respectively have the same functions as those of the annexed data obtainer 410, the annexed image data obtainer 420, and the encoder 430 of FIG. 4.

The annexed data obtainer 1410 may obtain annexed data from an image file 1402 including image data and the annexed data that is annexed to the image data. The annexed data obtainer 1410 may obtain the annexed data from the outside other than the image file 1402.

The annexed image data obtainer 1420 may convert the annexed data obtained from the annexed data obtainer 1410 and obtain annexed image data having the same format as that of the image data.

The encoder 1430 may obtain the image data from the image file 1402, obtain transmission image data based on the annexed image data and the image data, encode the transmission image data in a first codec, and obtain a bitstream 1404 including the transmission image data encoded in the first codec.

When the image file 1402 is encoded in the first codec, the annexed data obtainer 1410 may obtain the annexed data by decoding, in the first codec, the annexed data of the image file 1402 encoded in the first codec, and the encoder 1430 may decode the annexed image data obtained from the annexed image data obtainer 1420 in the first codec and obtain the bitstream 1404 including the transmission image data encoded in the first codec based on the image data encoded in the first codec and the annexed image data encoded in the first codec.

Figure 15:
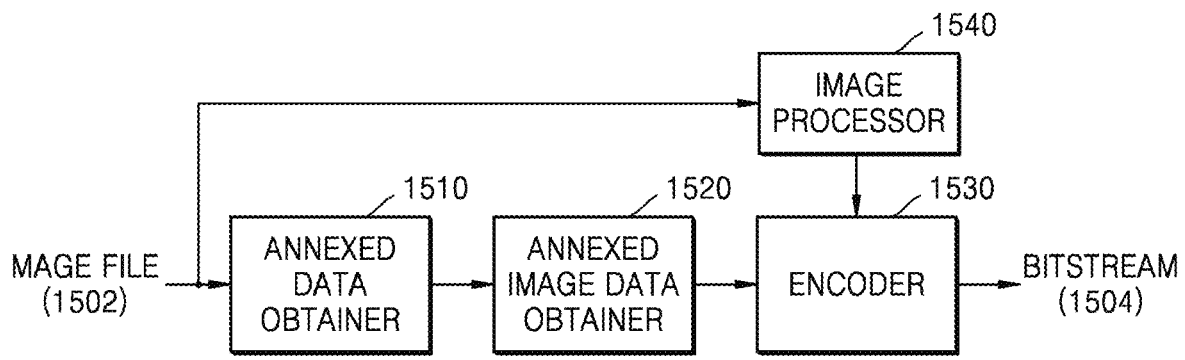
FIG. 15 is a diagram for describing an image encoding apparatus according to some exemplary embodiments.

FIG. 15 is a diagram for describing an image encoding apparatus according to some exemplary embodiments.

The image encoding apparatus 1500 of FIG. 15 may include an annexed data obtainer 1510, an annexed image data obtainer 1520, an encoder 1530, and an image processor 1540.

The annexed data obtainer 1510, the annexed image data obtainer 1520, the encoder 1530, and the image processor 1540 may respectively have the same functions as those of the annexed data obtainer 410, the annexed image data obtainer 420, the encoder 430, and the image processor 440 of FIG. 4.

The annexed data obtainer 1510 may obtain annexed data from an image file 1502 including image data and the annexed data that is annexed to the image data. The annexed data obtainer 1510 may obtain information regarding a result of image processing performed by the image processor 1540 as the annexed data.

The annexed data obtainer 1510 may include image processing data for processing the image data. The annexed image data obtainer 1520 may convert the annexed data obtained from the annexed data obtainer 1510 and obtain annexed image data having the same format as that of the image data.

The image processor 1540 may obtain the image data from the image file 1502 and convert obtained images based on the image processing data.

The encoder 1530 may obtain the image data processed by the image processor 1540, obtain transmission image data based on the annexed image data and the image data, encode the transmission image data in a first codec, and obtain a bitstream 1504 including the encoded transmission image data.

Figure 16:
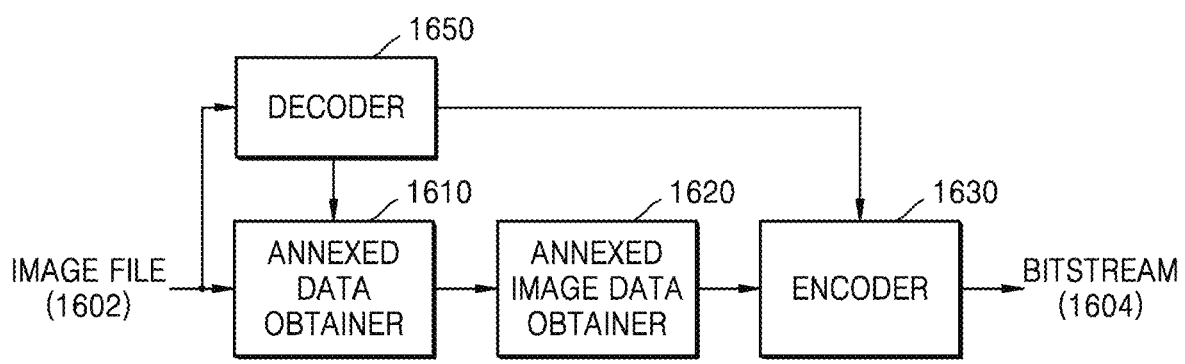
FIG. 16 is a diagram for describing an image encoding apparatus according to some exemplary embodiments.

FIG. 16 is a diagram for describing an image encoding apparatus according to some exemplary embodiments.

The image encoding apparatus 1600 of FIG. 16 may include an annexed data obtainer 1610, an annexed image data obtainer 1620, an encoder 1630, and a decoder 1650.

The annexed data obtainer 1610, the annexed image data obtainer 1620, the encoder 1630, and the decoder 1650 may respectively have the same functions as those of the annexed data obtainer 410, the annexed image data obtainer 420, the encoder 430, and the decoder 450 of FIG. 4.

When an image file 1602 is encoded in a second codec, the decoder 1650 may decode the image file 1602 in the second codec. The annexed data obtainer 1610 may obtain annexed data from the image file 1602 including image data and the annexed data that is annexed to the image data. The annexed image data obtainer 1620 may convert the annexed data obtained from the annexed data obtainer 1610 and obtain annexed image data having the same format as that of the image data. The encoder 1630 may obtain the image data from the image file 1602, obtain transmission image data based on the annexed image data and the image data, encode the transmission image data in a first codec, and obtain a bitstream 1604 including the encoded transmission image data.

Figure 17:
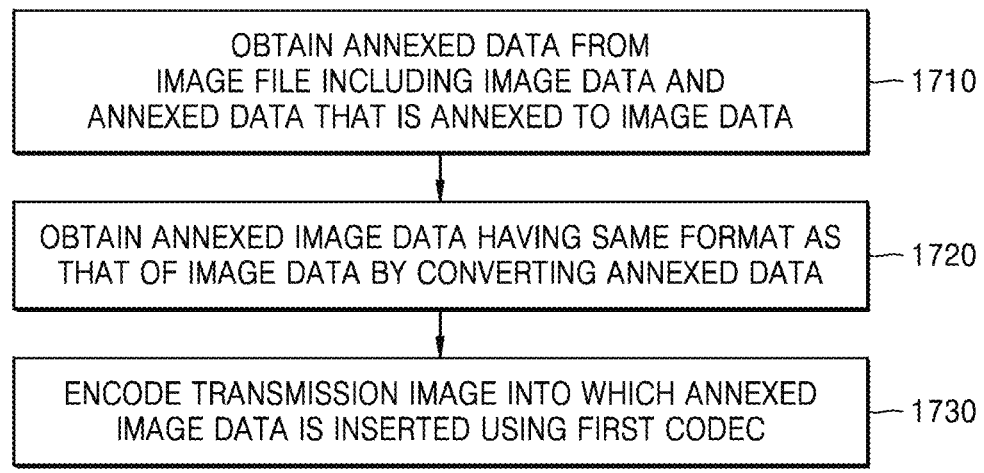
FIG. 17 is a flowchart for describing an image encoding method according to some exemplary embodiments.

FIG. 17 is a flowchart for describing an image encoding method according to some exemplary embodiments.

In operation 1710, annexed data may be obtained from an image file including image data and the annexed data that is annexed to the image data. The annexed data may be obtained from the outside other than the image file. When the annexed data obtained from the image file is encoded, the annexed data may be decoded. The annexed data may include all types of data annexed to the image data.

User authentication information indicating a user who is authorized to access the annexed data may be obtained. The user authentication information may be a multimedia reproduction apparatus that may use the annexed data.

In operation 1720, annexed image data having the same format as that of the image data may be obtained by converting the annexed data obtained in operation 1710. The annexed data may be converted into a predetermined format before being converted into the annexed image data. When there is a size limitation with respect to an image, the annexed data may be compressed before being converted into the annexed image data. When the annexed data includes personal information of a creator or a user of an image file, the annexed data may be encoded using a predetermined method before being converted into the annexed image data. When the annexed data is converted into the annexed image data, data conversion may be performed in consideration of a transmission channel environment.

In operation 1730, transmission image data may be obtained based on the annexed image data and the image data, the transmission image data may be encoded in a first codec, and a bitstream including the transmission image data encoded in the first codec may be obtained. When the transmission image data is obtained in a pixel domain, encoding may be performed on the entire transmission image data. When the annexed image data is obtained in a transform domain, encoding may be performed after a specific process. In this regard, when the bitstream including the encoded transmission image data is decoded by using a general image decoder, images corresponding to the image data and the annexed image data may be output.

Figure 18:
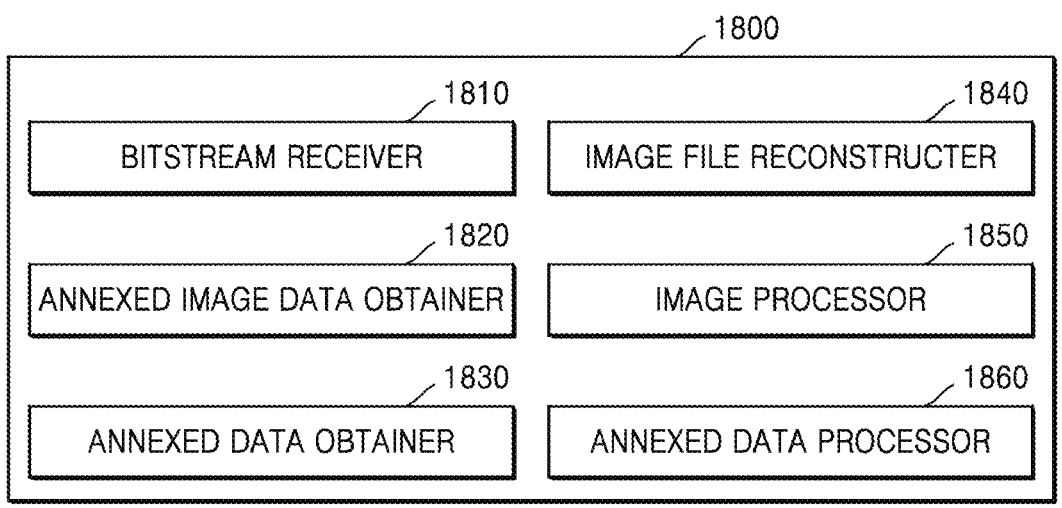
FIG. 18 is a diagram for describing an image decoding apparatus according to some exemplary embodiments.

FIG. 18 is a diagram for describing an image decoding apparatus 1800 according to some exemplary embodiments.

The image decoding apparatus 1800 may include a bitstream receiver 1810, an annexed image data obtainer 1820, an annexed data obtainer 1830, an image file reconstructer 1840, an image processor 1850, and an annexed data processor 1860.

The bitstream receiver 1810 may receive a bitstream obtained by encoding transmission image data obtained based on image data and annexed image data in a first codec.

The bitstream may be generated by an image encoding apparatus and transmitted to the image decoding apparatus 1800. When decoding is performed on the bitstream through a general image decoder, transmission image data in which annexed images corresponding to the annexed image data are inserted into or combined with images corresponding to the image data may be output.

The annexed image data obtainer 1820 may obtain the transmission image data by decoding the transmission image data encoded in a first codec included in the bitstream received from the bitstream receiver 1810 in the first codec. The annexed image data obtainer 1820 may obtain the annexed image data from the transmission image data.

The annexed data obtainer 1830 may obtain annexed data by converting the annexed image data obtained by the annexed image data obtainer 1820.

The annexed data obtainer 1830 may convert the annexed image data into the annexed data according to the data insertion order and the annexed data-image conversion table described with reference to FIGS. 5 through 13 above.

The annexed data obtainer 1830 may obtain the annexed data from the outside other than the annexed image data. For example, the annexed data obtainer 1830 may obtain the annexed data generated during an image decoding process like information necessary for image encoding and decoding. Likewise, the annexed data obtainer 1830 may obtain the annexed data like image processing information necessary for converting the image data.

The annexed data obtainer 1830 may obtain user authentication information indicating users who are authorized to access the annexed image. The annexed data obtainer 1830 may obtain the user authentication information by convert the annexed image data. According to exemplary embodiments, the annexed data obtainer 1830 may obtain the user authentication information from an external device other than the annexed image data.

The annexed data obtainer 1830 may determine whether a multimedia reproduction apparatus including the annexed data obtainer 1830 uses the annexed data according to the user authentication information. When the user authentication information indicates that the annexed data is allowed to be accessed or used by the multimedia reproduction apparatus, the annexed data obtainer 1830 may generate the annexed data from the annexed image data. To the contrary, when the user authentication information does not indicate that the annexed data is allowed to be accessed or used by the multimedia reproduction apparatus, the annexed data obtainer 1830 may not generate the annexed data from the annexed image data.

When the user authentication information includes a range of annexed data allowed to be accessed or used by multimedia reproduction apparatuses, the annexed data obtainer 1830 may obtain the annexed data according to the range of the allowed annexed data. For example, when image conversion information included in the annexed data is set to be activated in all multimedia reproduction apparatuses, and only audio data is set to be reproduced in a specific multimedia reproduction apparatus indicated by the user authentication information, the annexed data obtainer 1830 of the specific multimedia reproduction apparatus indicated by the user authentication information may obtain the image conversion information and the audio data. However, when the multimedia reproduction apparatus is not indicated by the user authentication information, the annexed data obtainer 1830 may obtain only the image conversion information.

The user authentication information may include the range of the annexed data allowed to be accessed or used by the multimedia reproduction apparatus. For example, the image conversion information included in the annexed data may be activated by all multimedia reproduction apparatuses, and only the audio data may be reproduced by the specific multimedia reproduction apparatus indicated by the user authentication information.

Multimedia reproduction apparatuses may have different ranges of the annexed data. For example, when the annexed data includes the audio data and text data, the range of the annexed data may be determined such that a first multimedia reproduction apparatus may reproduce only the audio data and a second multimedia reproduction apparatus may reproduce only the text data. The image file reconstructer 1840 may obtain the image data from the transmission image data and reconstruct an image file including the image data and the annexed data using the image data and the annexed data.

The image file reconstructer 1840 may not decode the bitstream in the first codec and may obtain image data encoded in the first codec. To the contrary, the image file reconstructor 1840 may decode the bitstream in the first codec and obtain image data decoded in the first codec.

The image file reconstructer 1840 may decode the bitstream in the first codec and obtain image data decoded in the first codec.

When the image data encoded in the first codec is obtained, the image file reconstructer 1840 may encode the annexed data obtained by the annexed data obtainer 1830 in the first codec and reconstruct an image file encoded in the first codec.

When the image data decoded in the first codec is obtained, the image file reconstructer 1840 may reconstruct an image file decoded in the first codec based on the annexed data obtained by the annexed data obtainer 1830 and the image data decoded in the first codec.

The reconstructed image file may be different from the image file before encoded by the image encoding apparatus due to transcoding during a transmission process or an image conversion process of the image encoding apparatus and the image decoding apparatus 1800.

The image processor 1850 may convert the image data based on the image processing information.

The image processor 1850 may obtain the image data from a bitstream received from the bitstream receiver 1810. In this regard, when the image data is obtained by decoding the bitstream 1802, the image data may be decoded in the first codec. When the image data is obtained by not decoding the bitstream 1802, the image data may not be decoded in the first codec and may be encoded in the first codec.

When the image data is decoded in the first codec, the image processor 1850 may process the image data in a pixel domain. Moreover, when the image data is encoded in the first codec, the image processor 1850 may process the image data in a transform domain.

The image processor 1850 may process the image data based on image processing information included in the annexed data obtained by the annexed data obtainer 1830. The image processor 1850 may perform image conversion that is opposite to image processing performed during an image encoding process. For example, when the image data is scrambled, the image processor 1850 may descramble the image data. For another example, the image processor 1850 may perform filtering capable of enhancing image quality. The image processor 1850 may perform rotation conversion on images corresponding to the image data. The image processor 1850 may perform color space conversion or resizing conversion on the image data.

The image processor 1850 may apply various image processing that is not based on the reconstructed image data.

The annexed data processor 1860 may process the annexed data.

For example, when the annexed data is compressed audio data, the annexed data processor 1860 may decode the compressed audio data and output the decoded audio data. When a decoded image is output on a display of a terminal, the decoded audio data may be also output.

For another example, when the annexed data is the text data, the annexed data processor 1860 may convert and output the text data into characters in an outputtable form. In more detail, when the decoded image is output on the display of the terminal, text in the outputtable form may be output on the decoded image using a specific method.

Figure 19:
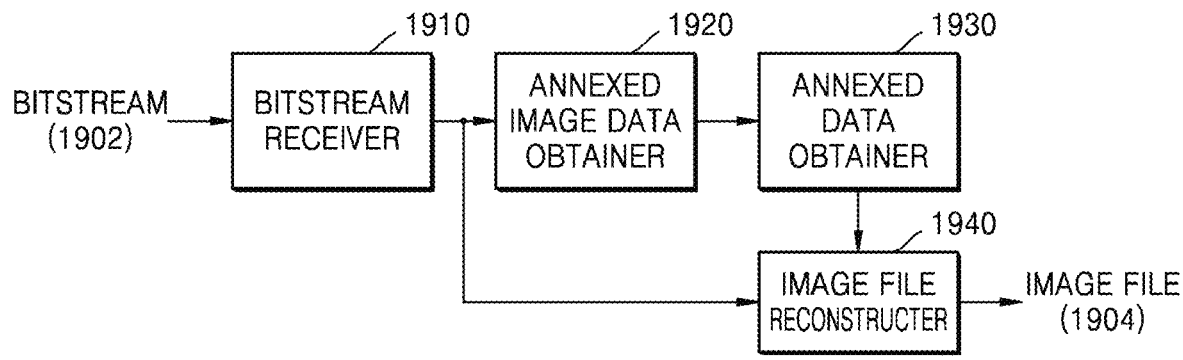
FIG. 19 is a diagram for describing an image decoding apparatus according to some exemplary embodiments.

FIG. 19 is a diagram for describing an image decoding apparatus according to some exemplary embodiments.

Figure 10:
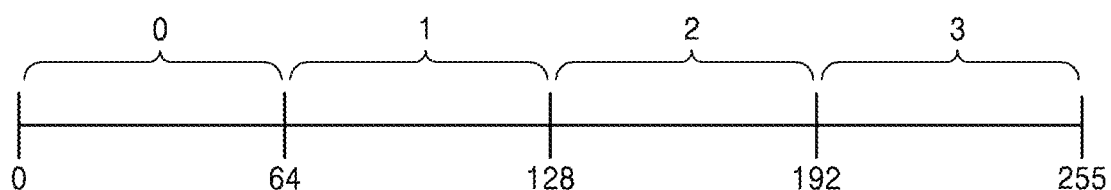
FIG. 10 is a diagram of a pixel unit data expression method according to another exemplary embodiment.

The image decoding apparatus 100 of FIG. 10 may include a bitstream receiver 1910, an annexed image data obtainer 1920, an annexed data obtainer 1930, and an image file reconstructer 1940.

The bitstream receiver 1910, the annexed image data obtainer 1920, the annexed data obtainer 1930, and the image file reconstructer 1940 may have the same functions as those of the bitstream receiver 1810, the annexed image data obtainer 1820, the annexed data obtainer 1830, and the image file reconstructer 1840 of FIG. 18.

The bitstream receiver 1910 may receive a bitstream 1902 including encoded transmission image data transmitted from an image encoding apparatus. The received bitstream 1902 may be transmitted to the annexed image data obtainer 1920 and the image file reconstructer 1940.

The annexed image data obtainer 1920 may obtain the encoded transmission image data included in the bitstream 1902 received from the bitstream receiver 1910. The annexed image data obtainer 1920 may obtain the transmission image data by decoding the encoded transmission image data in a first codec and obtain annexed image data from the transmission image data. The obtained annexed image data may be transmitted to the annexed data obtainer 1930. The annexed image data obtainer 1920 may obtain the annexed image data by decoding only bitstreams corresponding to the annexed image data.

The annexed data obtainer 1930 may obtain annexed data by converting the annexed image data obtained by the annexed image data obtainer 1920. The annexed data obtainer 1930 may obtain the annexed data from the outside. The obtained annexed data may be transmitted to the image file reconstructer 1940.

The image file reconstructer 1940 may obtain image data from the bitstream 1902 transmitted from the bitstream receiver 1910 and reconstruct an image file 1904 including the image data and the annexed data by using the annexed data obtained by the annexed data obtainer 1930 and the image data. The image file reconstructor 1940 may reconstruct the image file 1904 encoded in a first codec by combining bitstreams corresponding to the image data and the annexed data.

Figure 20:
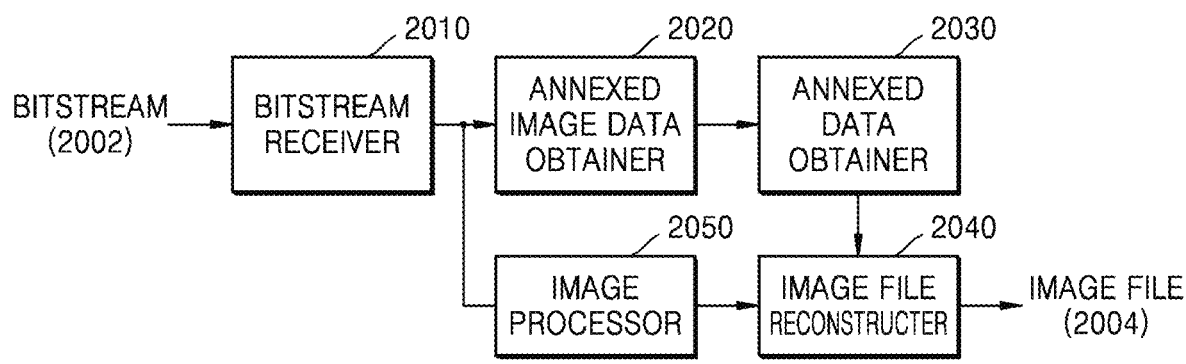
FIG. 20 is a diagram for describing an image decoding apparatus according to some exemplary embodiments.

FIG. 20 is a diagram for describing an image decoding apparatus according to some exemplary embodiments.

The image decoding apparatus 1900 of FIG. 20 may include a bitstream receiver 2010, an annexed image data obtainer 2020, an annexed data obtainer 2030, an image file reconstructer 2040, and an image processor 2050.

The bitstream receiver 2010, the annexed image data obtainer 2020, the annexed data obtainer 2030, the image file reconstructer 2040, and the image processor 2050 may have the same functions as those of the bitstream receiver 1810, the annexed image data obtainer 1820, the annexed data obtainer 1830, the image file reconstructer 1840, and the image processor 1850 of FIG. 18.

The bitstream receiver 2010 may receive a bitstream 2002 including encoded transmission image data transmitted from an image encoding apparatus. The received bitstream 2002 may be transmitted to the annexed image data obtainer 2020 and the image file reconstructer 2040.

The annexed image data obtainer 2020 may obtain the encoded transmission image data included in the bitstream 2002 received from the bitstream receiver 2010. The annexed image data obtainer 2020 may obtain the transmission image data by decoding the encoded transmission image data in a first codec and obtain annexed image data from the transmission image data. The obtained annexed image data may be transmitted to the annexed data obtainer 2030.

The annexed data obtainer 2030 may obtain annexed data by converting the annexed image data obtained by the annexed image data obtainer 2020. The annexed data obtainer 2030 may obtain the annexed data from the outside. The obtained annexed data may be transmitted to the image file reconstructer 2040.

The annexed data may include image processing information. The image processing information may be transmitted to the image processor 2050.

The image processor 2050 may obtain the bitstream 2002 transmitted from the bitstream receiver 2010 and the image processing information transmitted from the annexed data obtainer 2030. The image processor 2050 may obtain image data from the bitstream 2002 and process the image data based on the image processing information.

The image file reconstructer 2040 may obtain the image data transmitted from the image processor 2050 and reconstruct an image file 2004 including the image data and the annexed data by using the annexed data obtained by the annexed data obtainer 2030 and the image data.

Figure 21:
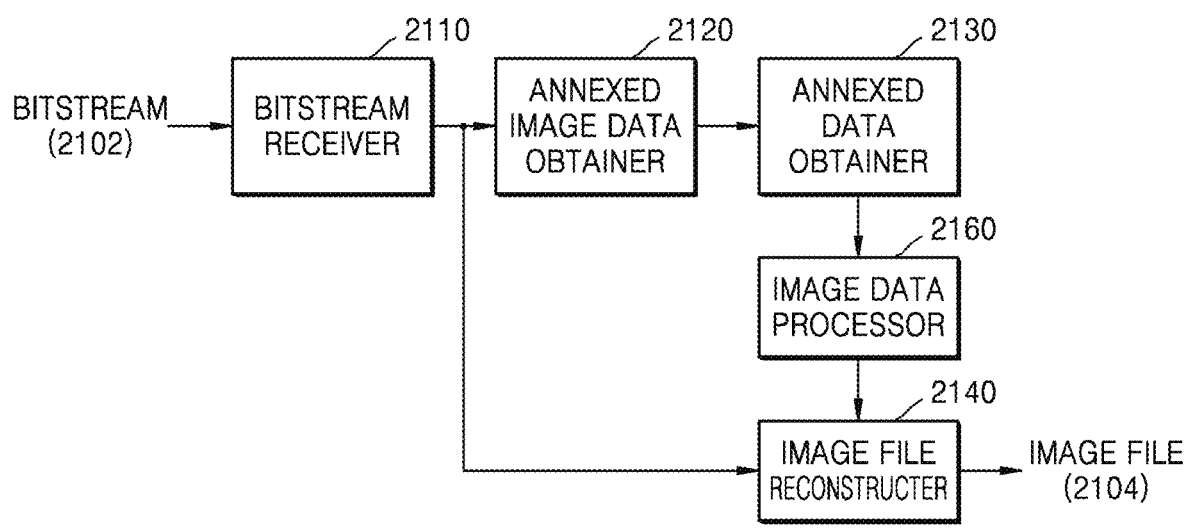
FIG. 21 is a diagram for describing an image decoding apparatus according to some exemplary embodiments.

FIG. 21 is a diagram for describing an image decoding apparatus according to some exemplary embodiments.

The image decoding apparatus 2100 of FIG. 21 may include a bitstream receiver 2110, an annexed image data obtainer 2120, an annexed data obtainer 2130, an image file reconstructer 2140, and an image data processor 2160.

The bitstream receiver 2110, the annexed image data obtainer 2120, the annexed data obtainer 2130, the image file reconstructer 2140, and the image data processor 2160 may have the same functions as those of the bitstream receiver 1810, the annexed image data obtainer 1820, the annexed data obtainer 1830, the image file reconstructer 1840, and the image data processor 1860 of FIG. 18.

The bitstream receiver 2110 may receive a bitstream 2102 including encoded transmission image data transmitted from an image encoding apparatus. The received bitstream 2102 may be transmitted to the annexed image data obtainer 2120 and the image file reconstructer 2140.

The annexed image data obtainer 2120 may obtain the encoded transmission image data included in the bitstream 2102 received from the bitstream receiver 2110. The annexed image data obtainer 2120 may obtain the transmission image data by decoding the encoded transmission image data in a first codec and obtain annexed image data from the transmission image data. The obtained annexed image data may be transmitted to the annexed data obtainer 2130.

The annexed data obtainer 2130 may obtain annexed data by converting the annexed image data obtained by the annexed image data obtainer 2120. The annexed data obtainer 2130 may obtain the annexed data from the outside. The obtained annexed data may be transmitted to the image data processor 2160.

The image file reconstructer 2140 may obtain image data from the bitstream 2102 transmitted from the bitstream receiver 2110 and reconstruct an image file 2104 including the image data and the annexed data by using the annexed data converted by the annexed data processor 2160 and the image data.

Figure 22:
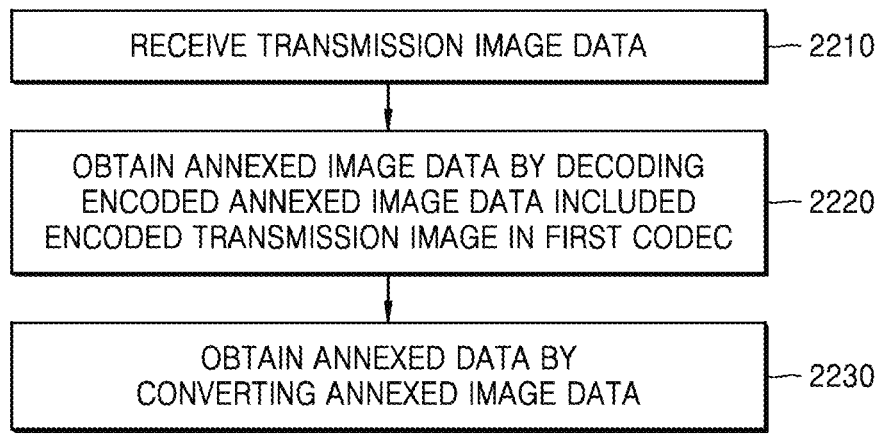
FIG. 22 is a flowchart for describing an image decoding method according to some exemplary embodiments.

FIG. 22 is a flowchart for describing an image decoding method according to some exemplary embodiments.

In operation 2210, a bitstream including transmission image data encoded in a first codec obtained based on image data and annexed image data may be received.

In operation 2220, transmission image data may be obtained by decoding the encoded transmission image data included in the bitstream in the first codec, and the annexed image data may be obtained from the transmission image data.

In operation 2230, annexed data may be obtained by converting the obtained annexed image data. The annexed data may be obtained by converting the annexed image data according to the data insertion sequence and the annexed data-image conversion table described with reference to FIGS. 5 through 13 above. The annexed data may be obtained from the outside other than the annexed image data.

User authentication information indicating users who are authorized to access the annexed data may be obtained. The annexed data may be determined according to the user authentication information.

The annexed data obtained using the image decoding methods described with reference to FIGS. 18 through 22 above may be applied to the image data in a multimedia reproduction apparatus. How to apply the annexed data to the image data will be described with reference to FIGS. 23 through 34 below.

Figure 23:
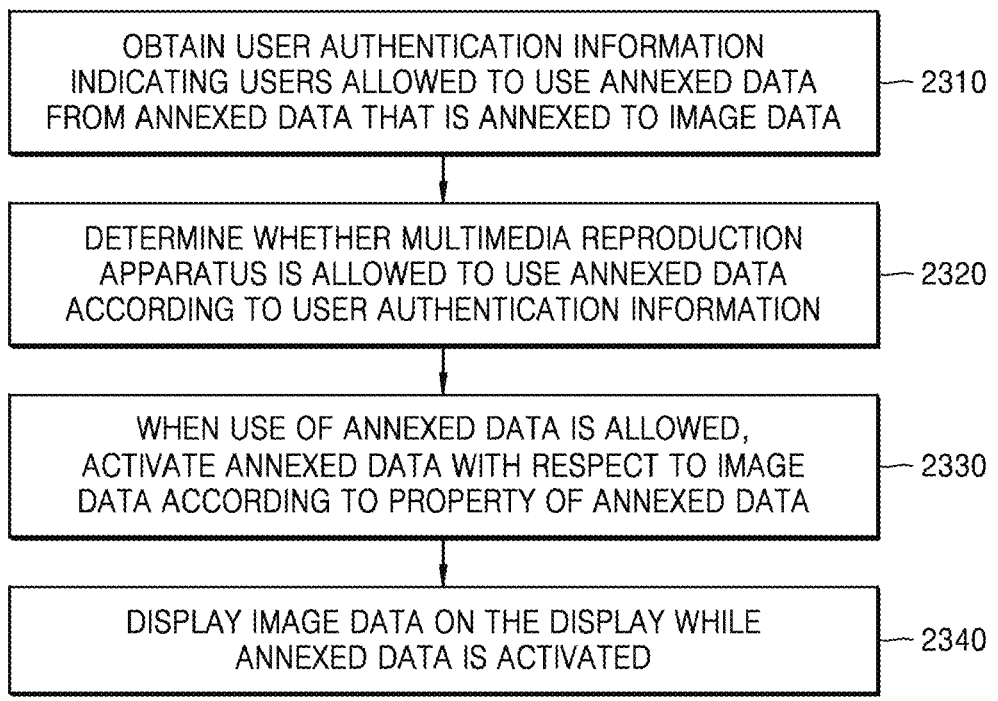
FIG. 23 is a flowchart for describing a method of displaying image data in a multimedia reproduction apparatus.

FIG. 23 is a flowchart for describing a method of displaying image data in a multimedia reproduction apparatus.

In operation 2310, user authentication information indicating users allowed to use annexed data may be obtained from the annexed data that is annexed to image data.

The user authentication information may indicate users who are authorized to access the annexed data. For example, the user authentication information may include an apparatus identifier of a multimedia reproduction apparatus allowed to use the annexed data. For another example, the user authentication information may include an identifier of a user who is authorized to use the annexed data.

The user authentication information may include a range of the annexed data allowed to be accessed or used by multimedia reproduction apparatuses. For example, image conversion information among the annexed data may be activated by all multimedia reproduction apparatuses, and only audio data may be reproduced by a specific multimedia reproduction apparatus indicated by the user authentication information.

Multimedia reproduction apparatuses may have different ranges of the annexed data. For example, when the annexed data includes the audio data and text data, the range of the annexed data may be determined such that a first multimedia reproduction apparatus may reproduce only the audio data and a second multimedia reproduction apparatus may reproduce only the text data.

Therefore, users of multimedia reproduction apparatuses may see image data to which different annexed data is applied according to the user authentication information.

The annexed data may be obtained from annexed image data converted into the same format as that of the image data. According to exemplary embodiments, the annexed data may be obtained from an external source other than transmission image data including the image data.

In operation 2320, it may be determined whether the multimedia reproduction apparatus is allowed to use the annexed data according to the user authentication information.

When the user authentication information indicates that the multimedia reproduction apparatus is allowed to use the annexed data, the annexed data may be applied to the image data. According to exemplary embodiments, when the user authentication information includes the range of the annexed data allowed to be accessed or used by the multimedia reproduction apparatuses, only data included in the range of the annexed data may be applied to the image data.

To the contrary, when the user authentication information indicates that the multimedia reproduction apparatus is not allowed to use the annexed data, the annexed data may not be applied to the image data. Therefore, a display of the multimedia reproduction apparatus may display only the image data without applying the annexed data.

In operation 2330, when use of the annexed data is allowed, the annexed data may be activated with respect to the image data according to a property of the annexed data.

When the use of the annexed data is allowed, an annexed data activation button for receiving a user input regarding whether to apply the annexed data may be displayed along with the image data. When the annexed data activation button is activated, the annexed data may be applied to the image data. To the contrary, when the annexed data activation button is deactivated, the annexed data may not be applied to the image data.

When the annexed data includes a plurality of data sets, a plurality of annexed data activation buttons respectively corresponding to the plurality of data sets may be displayed. For example, when the annexed data includes the audio data and the text data, annexed data activation buttons corresponding to the audio data and annexed data activation buttons corresponding to the text data may be displayed along with the image data.

Whether to activate the annexed data may be determined according to a motion signal of the multimedia reproduction apparatus. A method of reproducing the annexed data may be determined according to the motion signal.

For example, when a user shakes the multimedia reproduction apparatus, the annexed data may be activated according to a shaking signal. When the user shakes the multimedia reproduction apparatus again, the annexed data activated according to the shaking signal may be deactivated.

As a specific example, when memo data is reproduced on the image data displayed on the display, a reproduction of a memo data creating process may be omitted according to the shaking signal, and a resultant of the memo data may be displayed. The memo data may mean data that displays memo that is input according to a memo input signal of the user over time. The memo data will be described in more detail with reference to FIG. 27 below.

As another example, whether to activate the annexed data and a method of reproducing the annexed data may be determined according to a rotation signal of the multimedia reproduction apparatus.

As a specific example, when the multimedia reproduction apparatus rotates in relation to a vertical axis of the display, the reproduction of the annexed data may be stopped or omitted. When the reproduction of the annexed data is complete, if the multimedia reproduction apparatus rotates, the annexed data may be reproduced again. According to another exemplary embodiment, when the display inclines in a predetermined direction by a predetermined angle, the annexed data may be activated. A language provided by the annexed data may be exchanged according to the rotation signal.

In addition to the methods described above, whether to activate the annexed data and the method of reproducing the annexed data may be determined according to various motion signals.

The annexed data activation button will be described in detail with reference to FIG. 32 below.

When the annexed data includes the image conversion information, the image data may be converted according to the image conversion information. For example, a resolution of an image, a color format, etc. may be converted according to the image conversion information. As another example, brightness of the image data, a contrast ratio, and colors may be converted according to the image conversion information. The image conversion information will be described in detail with reference to FIG. 30 below.

When the annexed data includes location information, multimedia data or the image conversion information may be obtained from storage locations indicated by the location information. The location information may indicate data of a storage unit included in the multimedia reproduction apparatus. The location information may indicate data stored in a computing apparatus connected over a network. The obtained multimedia data may be activated and applied to the image data.

The location information may include purchase information of the data indicated by the location information. The purchase information may indicate a user who is authorized to use the data indicated by the location information or a multimedia reproduction apparatus of the user. The user indicated by the purchase information may enjoy paid multimedia content along with the image data. An exemplary embodiment of the location information will be described in detail with reference to FIG. 31 below.

Data included in the annexed data is not limited to the multimedia data, the image conversion information, and the location information. For example, the annexed data may include a text file that is not related to an image. As another example, the annexed data may include a program executed in an apparatus having a computing function.

When the image data is scrambled, and the annexed data includes a scramble key, the image data may be reconstructed based on the scramble key of the annexed data.

In operation 2340, the image data may be displayed on the display while the annexed data is activated.

When the annexed data includes the multimedia data, the multimedia data may be displayed on the display along with the image data. The multimedia data may include the text data, the image data, the audio data, the memo data, animation data, etc.

When the annexed data includes reproduction information, the multimedia data may be displayed along with the image data according to the reproduction information. The reproduction information may include reproduction location information indicating a part of the image data on which the multimedia data is displayed, reproduction time information indicating a multimedia reproduction time, etc. When the multimedia data includes a plurality of data sets regarding a plurality of pieces of multimedia content, the reproduction information may include reproduction sequence information of the multimedia content, information regarding whether the multimedia content interact, etc. Various exemplary embodiments of the reproduction of the multimedia data will be described in detail with reference to FIGS. 24 through 29 below.

When the annexed data includes the multimedia data, a reproduction control interface that controls reproduction of the multimedia data along with the image data may be displayed on the display. The reproduction control interface may include buttons used to instruct to start and stop the reproduction of the multimedia data, etc. For example, the reproduction control interface may include a start button, a stop button, etc. The reproduction control interface may include a reproduction location display bar that displays reproduction locations of the multimedia data. The reproduction control interface will be described in detail with reference to FIGS. 33A through 33D below.

When the annexed data is not activated, transmission image data that is a mixture of the annexed image data and the image data may be displayed on the display. Only the image data may be displayed except for the annexed image data among the transmission image data.

When the annexed data is activated, only the image data to which annexed images are applied may be displayed except for the annexed image data. Annexed data related information may be displayed on a part in which the annexed image data is located. For example, when the annexed data includes audio data regarding latest songs, lyrics of reproduced songs may be displayed.

An exemplary embodiment of displaying the annexed data related information, instead of the annexed image data, will be described in detail with reference to FIG. 34 below.

Figure 24:
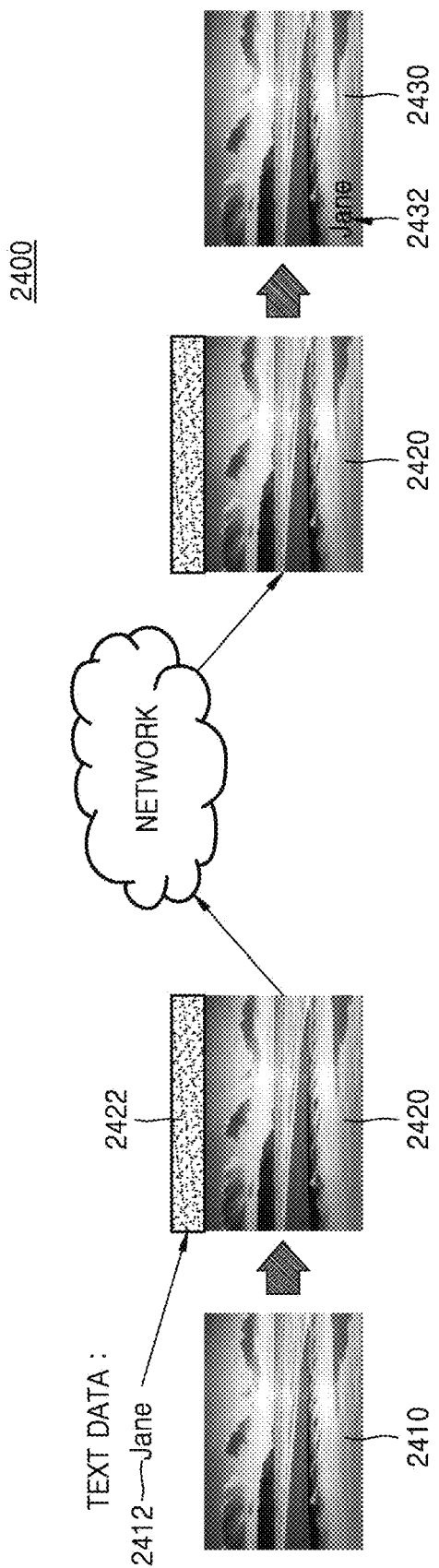
FIG. 24 is a diagram for describing an exemplary embodiment of displaying text data included in annexed data along with image data.

FIG. 24 is a diagram for describing an exemplary embodiment 2400 of displaying text data 2432 included in annexed data along with image data 2430.

An image encoding apparatus may generate annexed image data 2422 by converting text data 2412 that is inserted into image data 2410 into the same format as that of the image data 2410. The annexed image data 2422 may be combined with the image data 2410, which results in transmission image data 2420. The transmission image data 2420 may be encoded by the image encoding apparatus and may be transmitted to an image decoding apparatus over a network. The image decoding apparatus may reconstruct the annexed image data 2422 as the text data 2412. The text data 2412 may be disposed in the decoded image data 2410 such that the image data 2430 to which the text data 2412 is applied is displayed on a multimedia reproduction apparatus including the image decoding apparatus. The text data 2412 may include information regarding a location of a text message that is to be disposed in the image data 2410, a text font, a text size, a text color, etc.

If the multimedia reproduction apparatus including the image decoding apparatus may not access the annexed data, the transmission image data 2420 or the image data 2410 may be displayed. To the contrary, if the multimedia reproduction apparatus may access the annexed data, the image data 2430 including the text data 2432 may be displayed.

Figure 25:
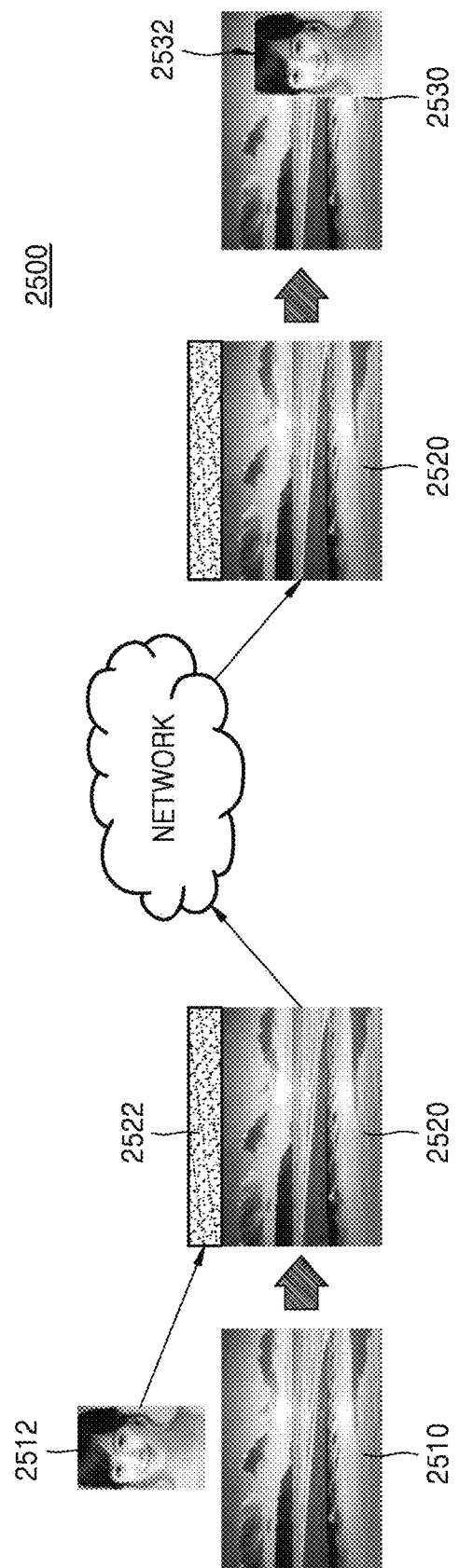
FIG. 25 is a diagram for describing an exemplary embodiment of displaying image data included in annexed data along with image data.

FIG. 25 is a diagram for describing an exemplary embodiment 2500 of displaying image data 2532 included in annexed data along with image data 2530.

An image encoding apparatus may convert image data 2512 that is inserted into image data 2510 into annexed image data 2522. The annexed image data 2522 may be combined with the image data 2510, which results in transmission image data 2520. The transmission image data 2520 may be encoded by the image encoding apparatus and may be transmitted to an image decoding apparatus over a network. The image decoding apparatus may reconstruct the annexed image data 2522 as the image data 2512. The image data 2512 may be disposed in the image data 2510 such that the image data 2530 into which the image data 2532 is inserted is displayed on a multimedia reproduction apparatus including the image decoding apparatus. The image data 2532 may include information regarding a location in the image data 2530 into which the image data 2532 is to be inserted.

If the multimedia reproduction apparatus including the image decoding apparatus may not access the annexed data, the transmission image data 2520 or the image data 2510 may be displayed. To the contrary, if the multimedia reproduction apparatus may access the annexed data, the image data 2530 including the image data 2532 may be displayed.

Figure 26:
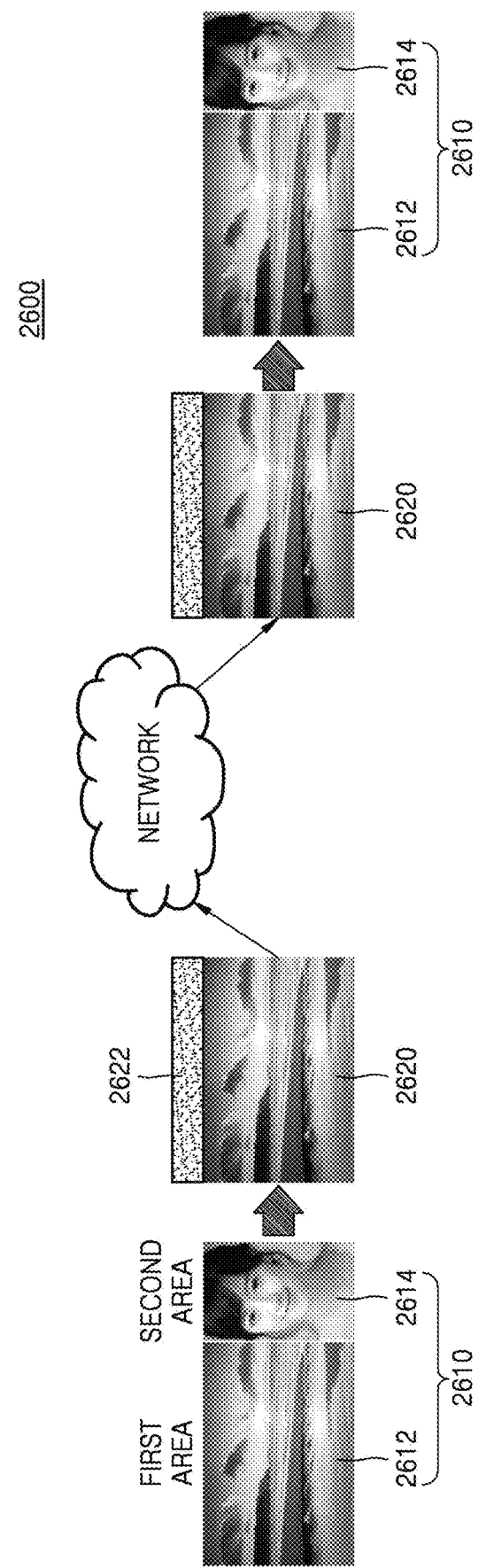
FIG. 26 is a diagram for describing an exemplary embodiment of transmitting image data by converting a part of the image data into annexed image data.

FIG. 26 is a diagram for describing an exemplary embodiment 2600 of transmitting image data 2610 by converting a part of the image data 2610 into annexed image data 2622.

An image encoding apparatus may convert a second area 2614 of the image data 2610 into the annexed image data 2622. The annexed image data 2622 may be combined with a first area 2612 of the image data 2610, which results in transmission image data 2620. The transmission image data 2620 may be encoded by the image encoding apparatus and may be transmitted to an image decoding apparatus over a network. The image decoding apparatus may reconstruct the annexed image data 2622 as the second area 2614. The image decoding apparatus may combine the first area 2612 and the second area 2614 to reconstruct the image data 2610.

If the multimedia reproduction apparatus including the image decoding apparatus may not access annexed data, only the first area 2612 may be displayed. To the contrary, if the multimedia reproduction apparatus may access the annexed data, the image data 2610 that is a combination of the first area 2612 and the second area 2614 may be displayed. Therefore, the second area 2614 may be seen only through a multimedia reproduction apparatus determined according to user authentication information.

Figure 27:
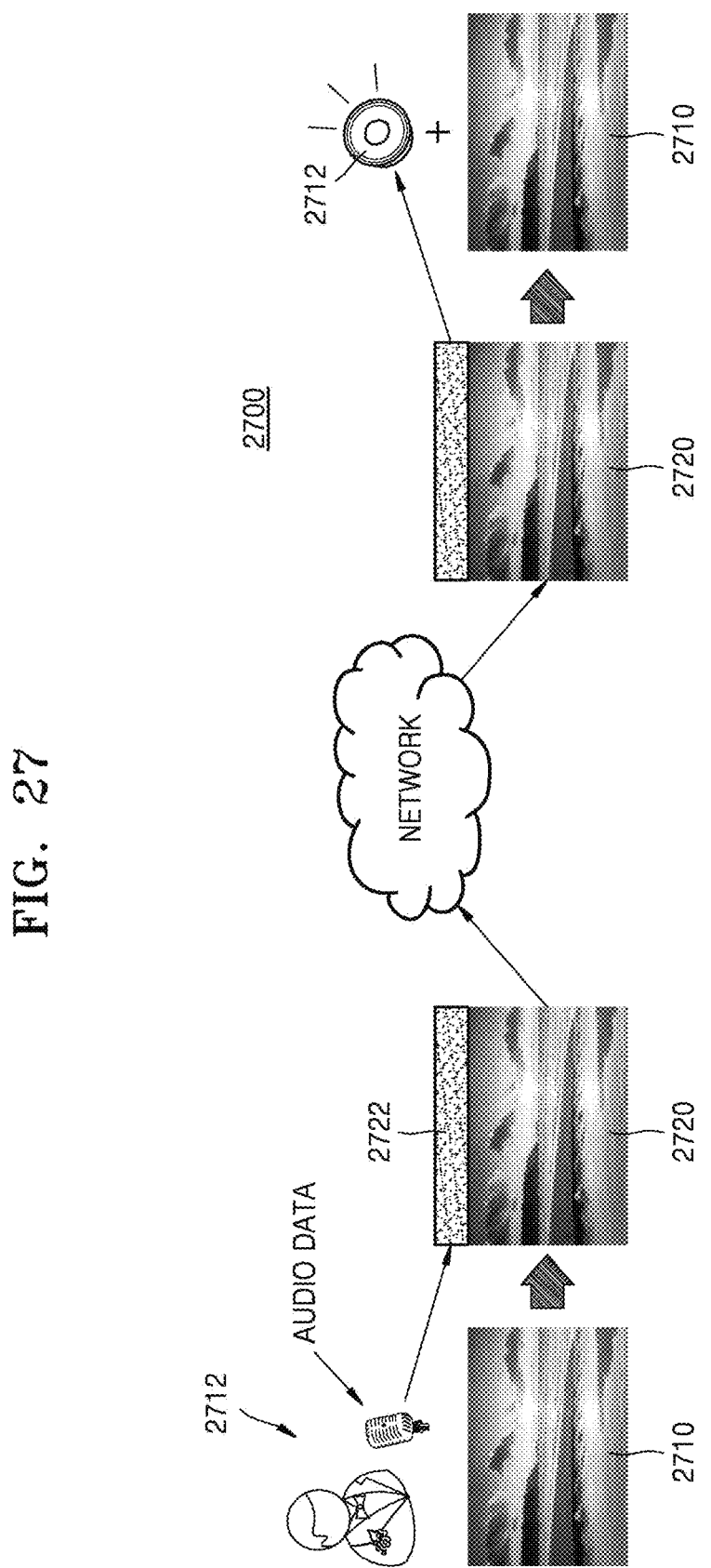
FIG. 27 is a diagram for describing an exemplary embodiment of reproducing audio data included in annexed data along with image data.

FIG. 27 is a diagram for describing an exemplary embodiment 2700 of reproducing audio data 2712 included in annexed data along with image data 2710.

An image encoding apparatus may generate annexed image data 2722 by converting the audio data 2712 that is inserted into the image data 2710 into the same format as that of the image data 2710. The annexed image data 2722 may be combined with the image data 2710, which results in transmission image data 2720. The transmission image data 2720 may be encoded by the image encoding apparatus and may be transmitted to an image decoding apparatus over a network. The image decoding apparatus may reconstruct the annexed image data 2722 as the audio data 2712. The image data 2710 may be displayed and simultaneously the audio data 2712 may be reproduced. The audio data 2712 may include information regarding a reproduction method, a reproduction time, etc.

If a multimedia reproduction apparatus including the image decoding apparatus may not access the annexed data, the transmission image data 2720 or the image data 2710 may be displayed. To the contrary, if the multimedia reproduction apparatus may access the annexed data, the image data 2710 may be displayed and simultaneously the audio data 2712 may be reproduced.

Figure 28:
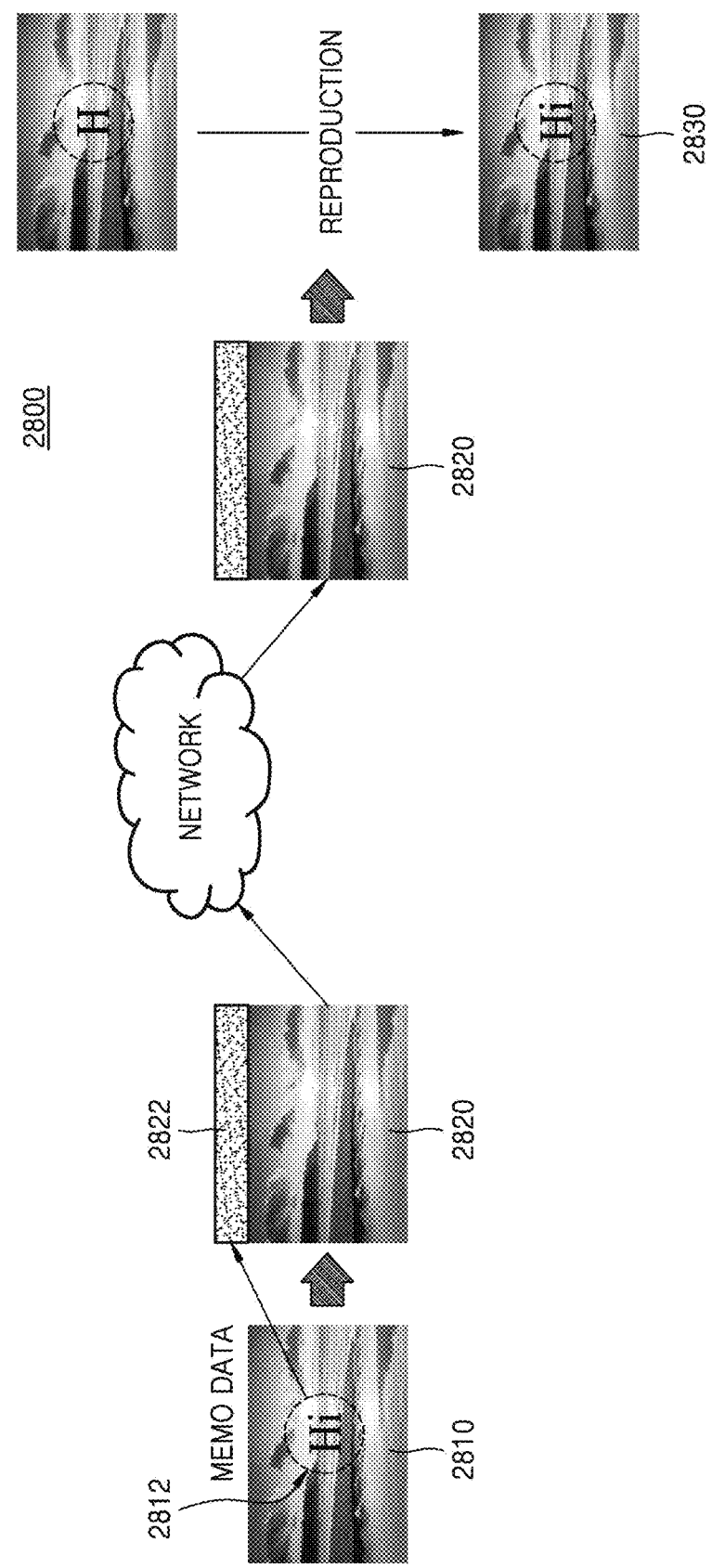
FIG. 28 is a diagram for describing an exemplary embodiment of reproducing memo data included in annexed data along with image data.

FIG. 28 is a diagram for describing an exemplary embodiment 2800 of reproducing memo data 2812 included in annexed data along with image data 2830.

An image encoding apparatus may generate annexed image data 2822 by converting the memo data 2812 that is inserted into image data 2810 into the same format as that of the image data 2810. The annexed image data 2822 may be combined with the image data 2810, which results in transmission image data 2820. The transmission image data 2820 may be encoded by the image encoding apparatus and may be transmitted to an image decoding apparatus over a network. The image decoding apparatus may reconstruct the annexed image data 2822 as the memo data 2812. The memo data 2812 may be reproduced on the image data 2820. The memo data 2812 may include information regarding characters, figures, etc. that are recorded on the image data 2810 according to an input signal of a user. The information that are included in the memo data 2812 and are recorded by the user on the image data 2810 may be arranged over time.

If a multimedia reproduction apparatus including the image decoding apparatus may not access the annexed data, the transmission image data 2820 or the image data 2810 may be displayed. To the contrary, if the multimedia reproduction apparatus may access the annexed data, the image data 2830 may be displayed and simultaneously the memo data 2812 may be reproduced.

Figure 29:
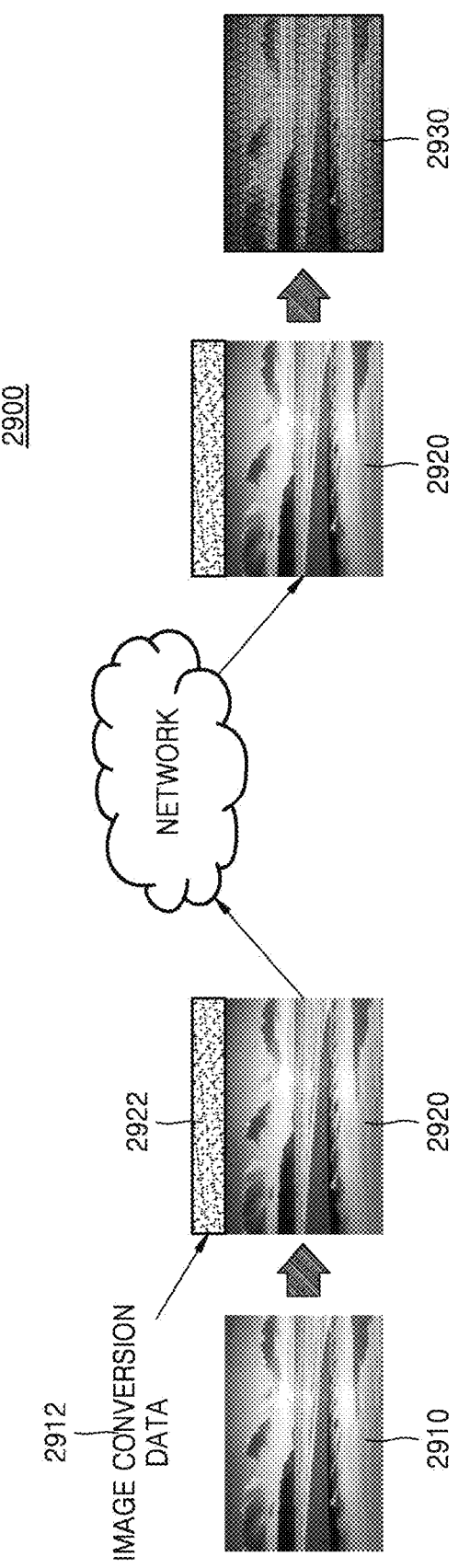
FIG. 29 is a diagram for describing an exemplary embodiment of converting image data according to image conversion data.

FIG. 29 is a diagram for describing an exemplary embodiment 2900 of converting image 2910 data according to image conversion data 2912.

The image conversion data 2912 applied to the image data 2910 may be converted into annexed image data 2922 having the same format as that of the image data 2910. The image data 2910 may be combined with the annexed image data 2922, which results in transmission image data 2920. The transmission image data 2920 may be encoded by an image encoding apparatus and may be transmitted to an image decoding apparatus over a network. The image decoding apparatus may reconstruct the annexed image data 2922 of the transmission image data 2920 as the image conversion data 2912. The image data 2910 may be converted according to the image conversion data 2912, and converted image data 2930 may be displayed.

If a multimedia reproduction apparatus including the image decoding apparatus may not access annexed data, the transmission image data 2920 or the image data 2910 may be displayed. To the contrary, if the multimedia reproduction apparatus may access the annexed data, the image data 2930 converted according to the image conversion data 2912 may be displayed.

Figure 30:
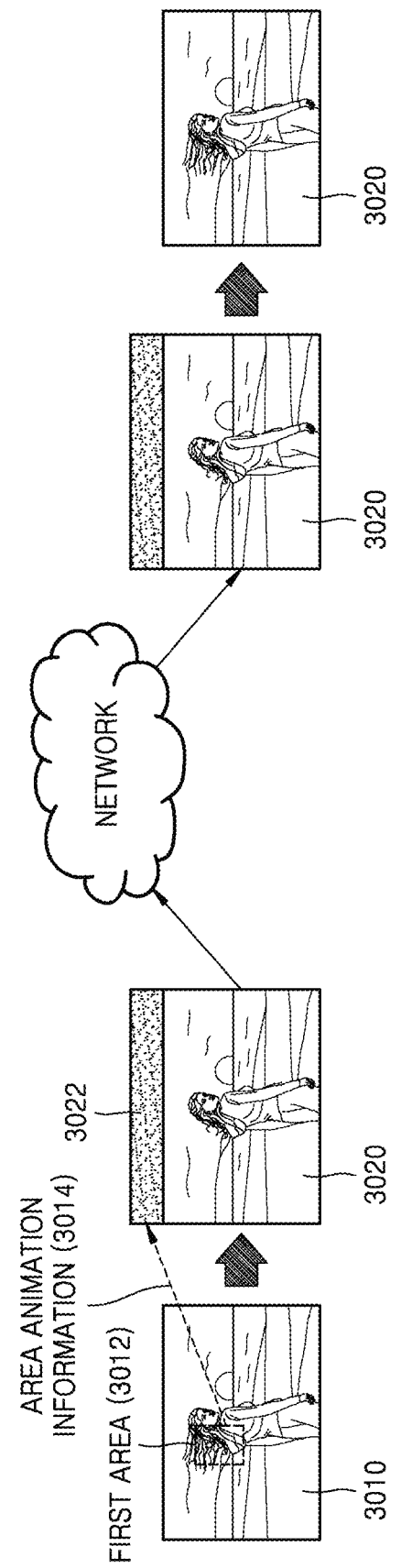
FIG. 30 is a diagram for describing an exemplary embodiment of providing a moving image effect to image data according to area animation information.

FIG. 30 is a diagram for describing an exemplary embodiment 3000 of providing a moving image effect to a first area 3012 of image data 3010 according to area animation information 3014.

The area animation information 3014 applied to the first area 3012 of the image data 3010 may be converted into annexed image data 3022 having the same format as that of the image data 3010. The image data 3010 may be combined with the annexed image data 3022, which results in transmission image data 3020. The transmission image data 3020 may be encoded by an image encoding apparatus and may be transmitted to an image decoding apparatus over a network. The image decoding apparatus may reconstruct the annexed image data 3022 of the transmission image data 3020 as the area animation information 3014. An animation effect may be applied to the first area 3012 of the image data 3010 according to the area animation information 3014. Image data 3030 to which the area animation information 3014 is applied may be displayed.

If a multimedia reproduction apparatus including the image decoding apparatus may not access annexed data, the transmission image data 3020 or the image data 3010 may be displayed. To the contrary, if the multimedia reproduction apparatus may access the annexed data, the image data 3030 to which the area animation information 3014 is applied may be displayed.

Figure 31:
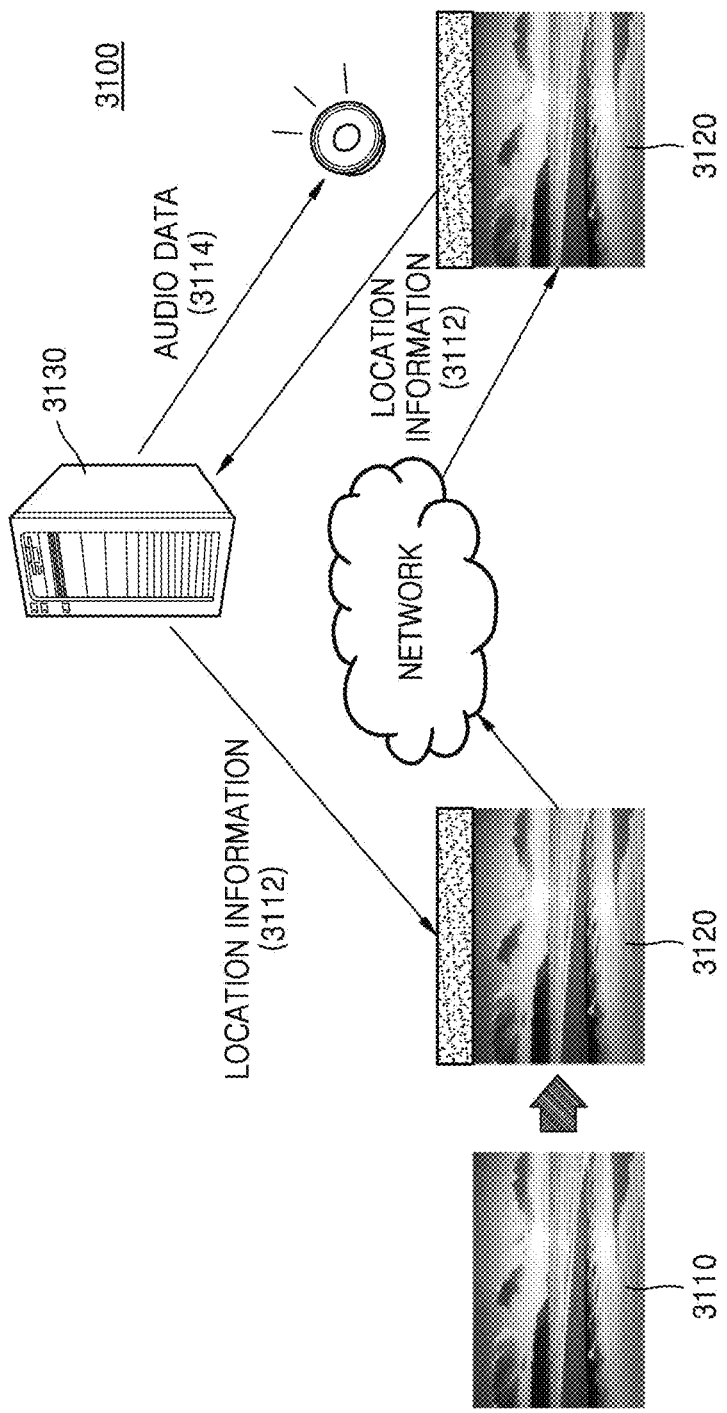
FIG. 31 is a diagram for describing an exemplary embodiment of obtaining data indicated by location information included in annexed data.

FIG. 31 is a diagram for describing an exemplary embodiment 3100 of obtaining data indicated by location information 3112 included in annexed data.

The location information 3112 may indicate a storage location in which multimedia data or image conversion information is stored. The location information 3112 may indicate the data stored in a computing apparatus connected over a network. Although the location information 3112 indicates audio data 3114 in FIG. 31, the location information 3112 may indicate a different type of data other than the audio data 3114. Although the location information 3112 indicates the data stored in a network server 3130 in FIG. 31, the location information 3112 may indicate data stored in all types of storages that may store data other than the network server 3130.

The location information 3112 may be converted into annexed image data 3122 having the same format as that of image data 3110. The image data 3110 may be combined with the annexed image data 3122, which results in transmission image data 3120. The transmission image data 3120 may be encoded by an image encoding apparatus and may be transmitted to an image decoding apparatus over a network. The image decoding apparatus may convert the annexed image data 3122 of the transmission image data 3120 into location information 3112. A multimedia reproduction apparatus including the image decoding apparatus may obtain data indicated by the location information 3112, and then activate the obtained data. For example, if the audio data 3114 is obtained as shown in FIG. 31, the image data 3110 may be displayed and simultaneously the audio data 3114 may be reproduced. As another example, when the image conversion information is obtained, the image data 3110 may be converted according to the image conversion information.

The location information 3112 may include purchase information of the data indicated by the location information 3112. The purchase information may indicate a user who is authorized to use the data indicated by the location information 3112 or a multimedia reproduction apparatus of the user. The purchase information may be obtained from the network server 3130 in correspondence to a purchase of a transmitter of the transmission image data 3120. Thus, a receiver of the transmission image data 3120 may obtain paid data without any payment according to the purchase information. The network server 3130 may obtain the purchase information included in the location information 3112. The multimedia reproduction apparatus may determine lawful authorization of the data indicated by the location information 3112 according to the purchase information.

If the multimedia reproduction apparatus including the image decoding apparatus may not access the location information 3112, the transmission image data 3120 or the image data 3110 may be displayed. To the contrary, if the multimedia reproduction apparatus may access the location information 3112, the data indicated by the location information 3112 may be obtained and activated. Thus, the transmitter of the transmission image data 3120 may allow only a specific receiver determined by the transmitter to use the paid data.

Figure 32:
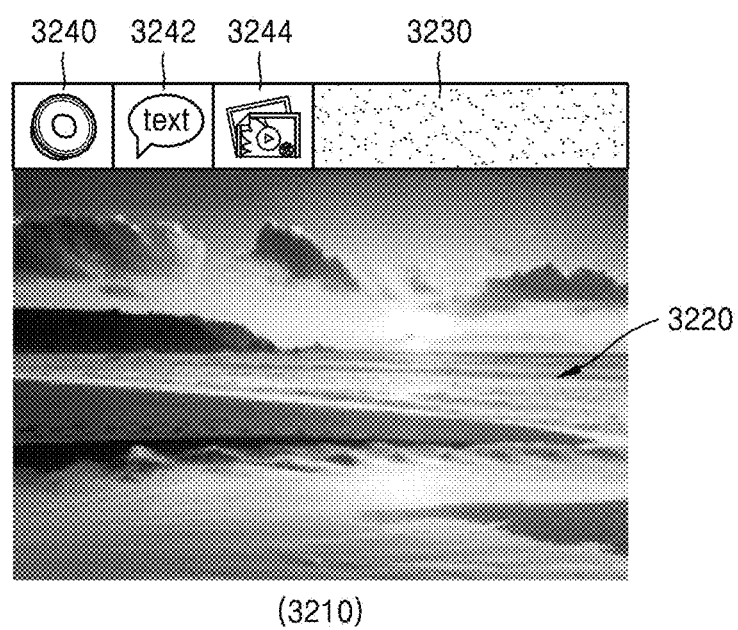
FIG. 32 is a diagram for describing annexed data activation buttons used to receive a user input for determining whether to activate annexed data.

FIG. 32 is a diagram for describing annexed data activation buttons 3240, 3242, and 3244 used to receive a user input for determining whether to activate annexed data.

Transmission image data 3210 may include image data 3220 and annexed image data 3230. When the annexed image data 3230 includes a plurality of data sets, only a part of the data sets may be activated by the user input. Therefore, the annexed data activation buttons 3240, 3242, and 3244 respectively corresponding to the data sets may be displayed along with the image data 3220 in order to receive the user input. For example, when the annexed image data 3230 of FIG. 32 includes audio data, text data, and visual effect data, the annexed data activation buttons 3240, 3242, and 3244 respectively corresponding to the audio data, the text data, and the visual effect data may be displayed along with the image data 3220. A user may click the annexed data activation buttons 3240, 3242, and 3244, thereby activating the data sets that are to be applied to the image data 3220.

In more detail, if the user clicks the annexed data activation button 3240 corresponding to the audio data, the audio data may be reproduced. If the user clicks the annexed data activation button 3242 corresponding to the text data, the text data may be displayed. Likewise, if the user clicks the annexed data activation button 3244 corresponding to the visual effect data, a visual effect may be applied to the image data 3220.

The annexed data activation buttons 3240, 3242, and 3244 may be displayed only a multimedia reproduction apparatus that may access the annexed data based on user authentication information. When the multimedia reproduction apparatus is allowed to use only a part of the data sets included in the annexed data based on user authentication information, the annexed data activation buttons 3240, 3242, and 3244 corresponding to the allowed data sets may be displayed.

Although the annexed data activation buttons 3240, 3242, and 3244 are displayed on an upper end of the image data 3220 in FIG. 32, the annexed data activation buttons 3240, 3242, and 3244 may be located in a different area. For example, the annexed data activation buttons 3240, 3242, and 3244 may be located in a lower end of the image data 3220.

FIGS. 33A through 33D are diagrams for describing reproduction control interfaces 3320, 3330, 3340, and 3350 used to display reproduction statuses of a plurality of reproducible data sets included in annexed data.

The reproduction control interfaces 3320, 3330, 3340, and 3350 may be configured as reproduction control bars 3322, 3332, 3342, and 3352 and reproduction location indicators 3324, 3334, 3344, and 3354 that indicate reproduction locations. The reproduction location indicators 3324, 3334, 3344, and 3354 may be disposed on the reproduction control bars 3322, 3332, 3342, and 3352, respectively. The reproduction location indicators 3324, 3334, 3344, and 3354 disposed on the reproduction control bars 3322, 3332, 3342, and 3352 may be moved, and thus the reproduction locations of the data sets may be adjusted.

The reproduction control interfaces 3320, 3330, 3340, and 3350 may include reproduction control buttons corresponding to reproduction related commands such as a reproduction button, a stop button, a skip button, etc. When there is a user input regarding the reproduction button, additional data may be reproduced. To the contrary, when there is user input regarding the stop button, reproduction of the additional data may be stopped. When there is a user input regarding the skip button, the reproduction of the additional data may be completed. In addition, the reproduction control interfaces 3320, 3330, 3340, and 3350 may include various types of reproduction control buttons that perform reproduction buttons such as fast reproduction, section repeat, etc.

Alternatively, the reproduction control interfaces 3320, 3330, 3340, and 3350 may analyze a touch signal that a user inputs to a display and adjust the reproduction of the additional data. For example, when the user touches the display one time, the additional data in a reproduction stop status may be reproduce. When the user touches the display once more during the reproduction of the additional data, the reproduction of the additional data may be stopped.

Although the control interfaces 3320, 3330, 3340, and 3350 are displayed on an upper end of image data 3310, the control interfaces 3320, 3330, 3340, and 3350 may be located in different areas according to exemplary embodiments. For example, the control interfaces 3320, 3330, 3340, and 3350 may be located in a lower end of the image data 3310.

Figure 33A:
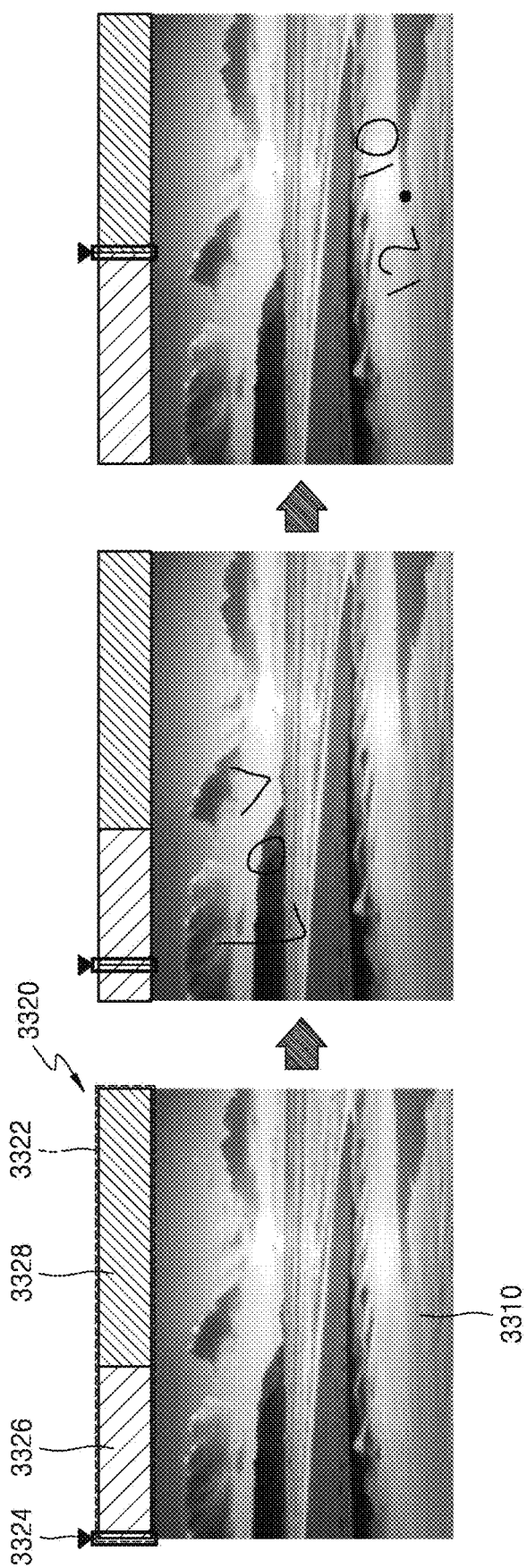
FIGS. 33A through 33D are diagrams for describing reproduction control interfaces used to display reproduction statuses of a plurality of reproducible data sets included in annexed data.

Two data sets regarding memo data may be activated in FIG. 33A. The two data sets may be sequentially reproduced. Thus, second memo data may be reproduced after first memo data is reproduced. To distinguish the first and second memo data from each other, the reproduction control bar 3322 may be split into a part 3326 corresponding to a reproduction section of the first memo data and a part 3328 corresponding to a reproduction section of the second memo data.

Figure 33B:
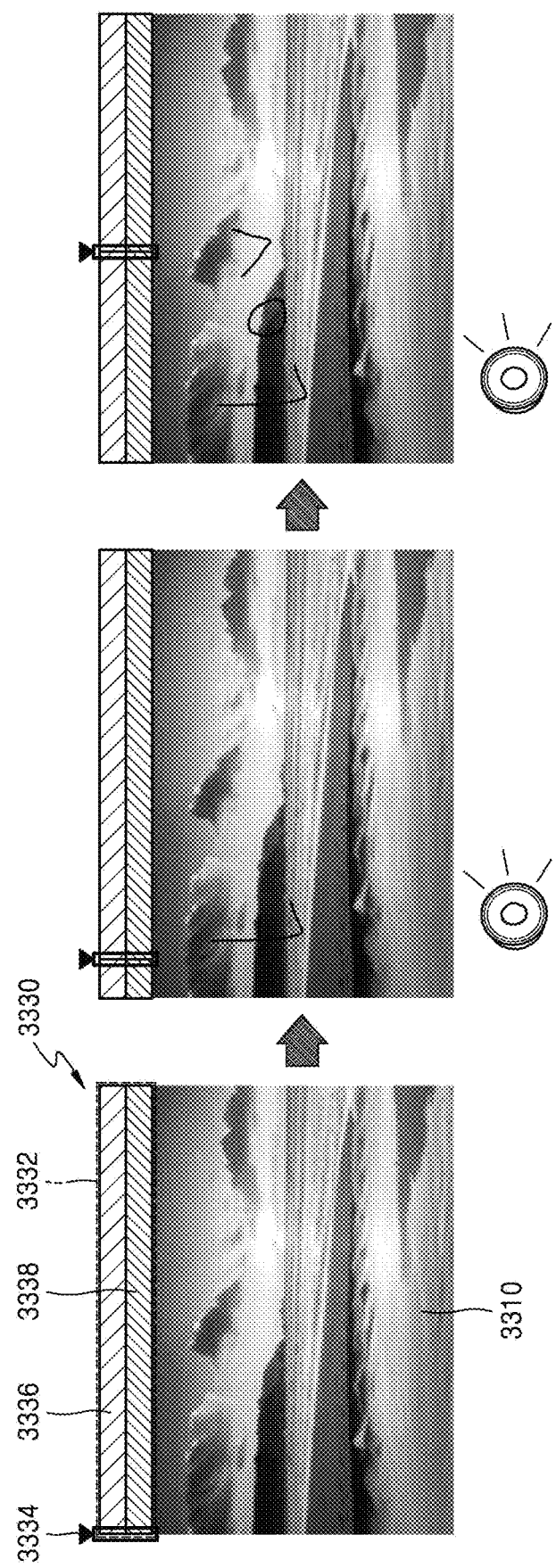

Two data sets regarding memo data and audio data may be activated in FIG. 33B. The two data sets may be reproduced in parallel to each other. Thus, the memo data and the audio data may be simultaneously reproduced. To display a simultaneous reproduction of first and second data sets, the reproduction control bar 3332 may be split into two layers 3336 and 3338.

Figure 33C:
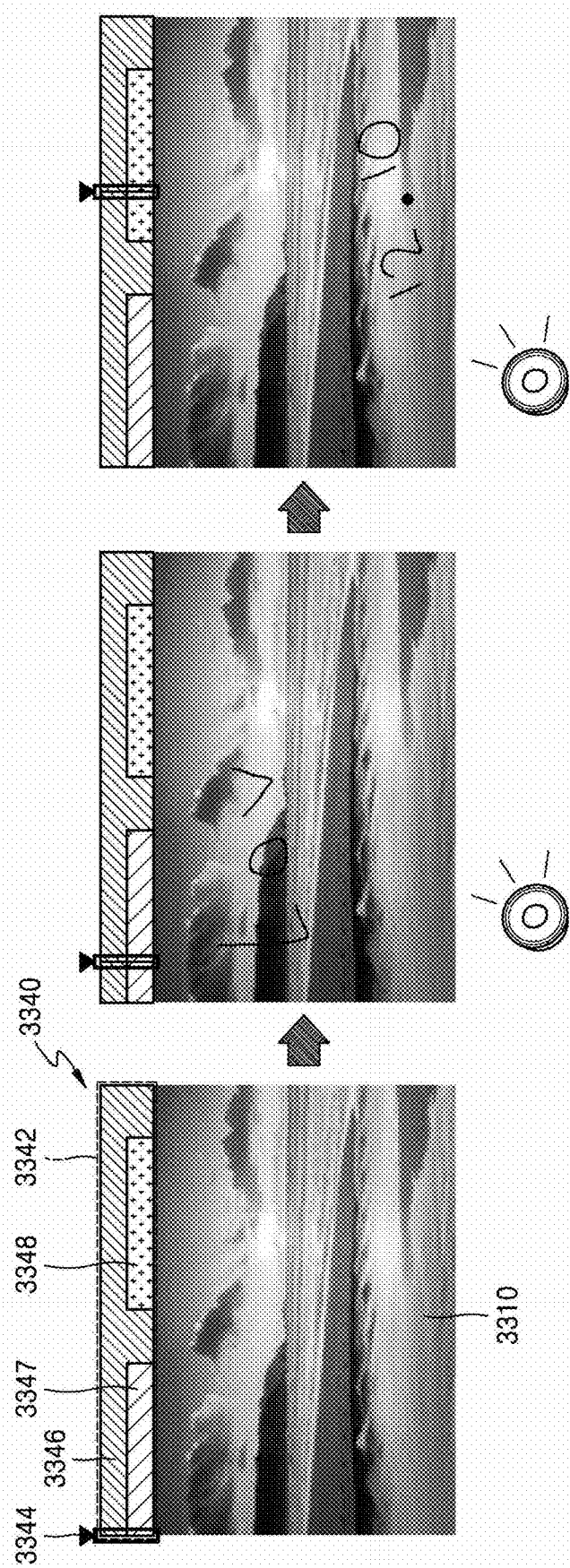

Two data sets regarding memo data and one data set regarding audio data may be activated in FIG. 33C. The two data sets regarding memo data may be sequentially reproduced. The one data set regarding the audio data may be reproduced in parallel with the two data sets regarding memo data. The reproduction control bar 3342 may be split into parts 3346, 3347, and 3348 corresponding to the two pieces of memo data and the one piece of the audio data. Reproduction sections of the parts 3347 and 3348 corresponding to the two pieces of memo data do not overlap with each other, and thus the parts 3347 and 3348 may be disposed on the same layer. A reproduction section of the part 3346 corresponding to the audio data may overlap with the reproduction sections of the parts 3347 and 3348, and thus the part 3346 may be disposed in a different layer from the parts 3347 and 3348.

Figure 33D:
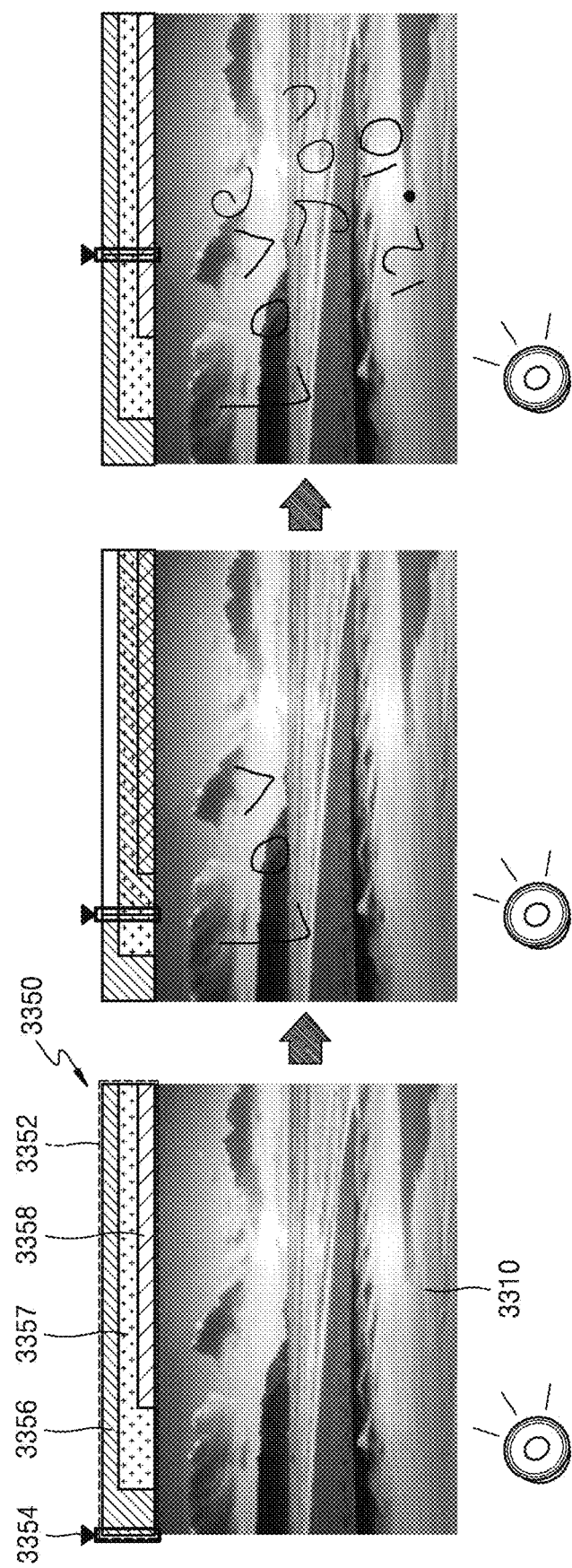

Two data sets regarding memo data and one data set regarding audio data may be activated in FIG. 33D, like FIG. 33C. However, the two data sets regarding memo data and the one data set regarding the audio data may be reproduced in parallel to each other. Thus, the reproduction bar 3352 may be split into three layers according to the number of data sets reproduced in parallel. Parts 3356, 3357, and 3358 corresponding to the two pieces of memo data and the one piece of the audio data may be disposed in the three layers according to reproduction sections.

FIG. 34 is a diagram for describing an exemplary embodiment of hiding annexed image data 3430 of a transmission image 3410 and displaying information regarding image data 3420 on a location of the annexed image data 3430.

The image data 3420, excluding the annexed image data 3430, may be displayed on a display of a multimedia reproduction apparatus that is not authorized to access annexed data based on user authentication information. However, the annexed image data 3430 may be replaced with an image data information interface 3440 on a display of a multimedia reproduction apparatus that is authorized to access the annexed data based on the user authentication information. Not only the information regarding the image data 3420 but also information regarding activated annexed data may be displayed on the image data information interface 3440.

For example, the image data information interface 3440 may display a date on which the image data 3420 is created and a title of the image data 3420. If audio data included in the annexed data is activated, the image data information interface 3440 may display lyrics of songs of the audio data and composer information.

Figure 35:
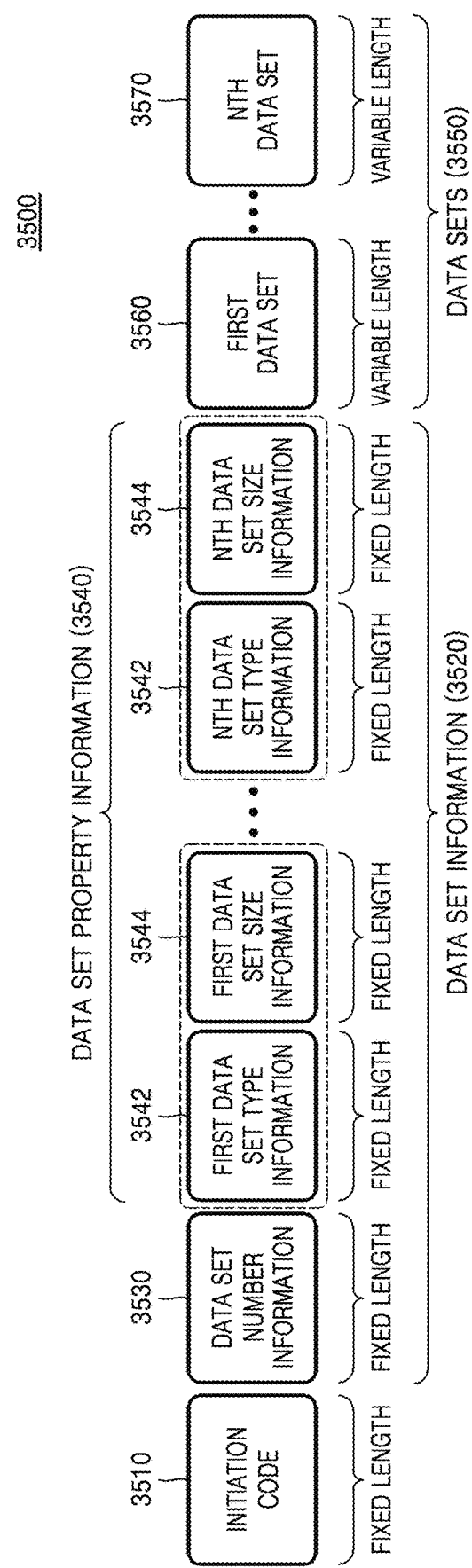
FIG. 35 is a diagram of a data format of annexed data.

FIG. 35 is a diagram of a data format of annexed data 3500.

The annexed data 3500 may include an initiation code 3510, data set information 3520, and data sets 3550.

The annexed data 3500 may start the initiation code 3510. The initiation code 3510 may have a predetermined value and may have a fixed length. An image decoding apparatus may track the initiation code 3510 to detect the annexed data from a bitstream transmitted from the image encoding apparatus.

The annexed data 3500 may include the data set information 3520 after the initiation code 3510. The data set information 3520 may include data set number information 3530 indicating the number of the data sets 3550 and data set property information 3540 indicating types of the data sets the data sets 3550. The data set number information 3530 and the data set property information 3540 may have fixed lengths. The image decoding apparatus may determine the number of the data sets 3550 included in the annexed data 3500 according to the data set number information 3530. The image decoding apparatus may obtain as much data set property information 3540 of each of the data sets 3500 as the number of data sets 3500.

The data set property information 3540 may include information 3542 regarding the types of the data sets 3500 and information 3544 regarding sizes of the data sets 3500. For example, the data set property information 3540 regarding a first data set 3560 may include audio data as the type of the first data set 3560 and 800 bits as the size thereof.

The image decoding apparatus may obtain the data sets 3550 according to the data set information 3520 after obtaining the data set information 3520. For example, when the type of the first data set 3560 is the audio data and the size thereof is 800 bits, the image decoding apparatus may obtain data of 800 bits according to the size of the first data set 3560 after obtaining the data set information 3520. The image decoding apparatus may decode the data of 800 bits according to a format of the audio data. Likewise, when the type of a second data set 3570 is text data and the size thereof is 100 bits, the image decoding apparatus may obtain data of 100 bits according to the size of the second data set 3570 after obtaining the first data set 3560. The image decoding apparatus may decode the data of 100 bits according to a format of the text data. When the data set number information 3530 indicates that the annexed data 3500 includes N data sets, the image decoding apparatus may repeatedly perform the above-described data set obtaining process on the N data sets.

The above-described exemplary embodiments may be written as computer programs and may be implemented in general-use digital computers as well as specialized computers that execute the programs using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.), and transmission media such as Internet transmission media.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image encoding apparatus comprising:
   an annexed data obtainer configured to obtain annexed data that is annexed to image data and that is to be transmitted along with the image data;
   an annexed image data obtainer configured to:
   determine how many bits in the annexed data are expressed on a basis of a pixel unit, based on transmission channel environment;
   determine a plurality of fixed pixel values based on the determination of how many bits in the annexed data are expressed on the basis of a pixel unit; and
   obtain annexed image data by allocating a fixed pixel value from among the plurality of fixed pixel values, which corresponds to at least one bit in the annexed data, to each pixel of the annexed image data; and
   an encoder configured to obtain transmission image data based on the annexed image data and the image data and encode the transmission image data according to a first codec.

2. The image encoding apparatus of claim 1, wherein the annexed data comprises image processing data configured to convert the image data,
   the image encoding apparatus further comprising: an image processor configured to process the image data according to the image processing data.

3. The image encoding apparatus of claim 1, wherein the annexed data obtainer is further configured to obtain the annexed data from an image file including the image data.

4. The image encoding apparatus of claim 3, wherein in response to the image data of the image file and the annexed data being encoded in the first codec, the annexed data obtainer is further configured to obtain the annexed data by decoding, in the first codec, the annexed data encoded in the first codec, and
   wherein the encoder is further configured to encode the annexed image data converted from the annexed data in the first codec and obtain the transmission image data encoded in the first codec by using the annexed image data encoded in the first codec and the image data encoded in the first codec.

5. The image encoding apparatus of claim 3, further comprising: a decoder,
   wherein, in response to the image data of the image file and the annexed data being encoded in a second codec, the decoder is configured to decode the image data and the annexed data in the second codec.

6. The image encoding apparatus of claim 1, wherein the annexed data obtainer is further configured to obtain the annexed data including at least one from among an annexed data identifier inserted into the annexed data and annexed image conversion information regarding a method of converting the annexed data into the annexed image data in order to distinguish the annexed data from the image data.

7. The image encoding apparatus of claim 1, wherein the annexed data obtainer is further configured to obtain the annexed data from at least one from among: encoding data obtained during an encoding process and user data obtained based on a user input.

8. The image encoding apparatus of claim 1, wherein, in response to there being an image size limitation with respect to the transmission image data, the annexed image data obtainer is further configured to compress the annexed data according to the image size limitation, convert the compressed annexed data, and obtain the annexed image data.

9. The image encoding apparatus of claim 1, wherein the annexed image data obtainer is further configured to obtain user authentication information indicating users who are authorized to access the annexed data.

10. An image decoding apparatus comprising:
    a bitstream receiver configured to receive a bitstream comprising encoded transmission image data encoded in a first codec;
    an annexed image data obtainer configured to obtain transmission image data by decoding the encoded transmission image data encoded in the first codec and to obtain annexed image data from the transmission image data;
    an annexed data obtainer configured to obtain annexed data by converting the obtained annexed image data, wherein the annexed data comprises image processing information configured to convert to the image data; and
    an image file reconstructor configured to obtain image data from the transmission image data and reconstruct an image file by using the image data and the annexed data,
    wherein the annexed data is obtained by converting pixels of the annexed image data into bits of the annexed data, and
    wherein the annexed image data have a same format as that of the image data, and a number of bits in the annexed data which are expressed by one pixel of the annexed image data is determined based on transmission channel environment, and
    wherein the annexed data is annexed to the image data.

11. The image decoding apparatus of claim 10, wherein the image decoding apparatus further comprising: an image processor configured to process the image data according to the image processing information.

12. An image decoding apparatus comprising:
    a bitstream receiver configured to receive a bitstream comprising encoded transmission image data encoded in a first codec;
    an annexed image data obtainer configured to obtain transmission image data by decoding the encoded transmission image data encoded in the first codec and to obtain annexed image data from the transmission image data; and
    an annexed data obtainer configured to obtain annexed data by converting the obtained annexed image data,
    wherein the transmission image data is obtained based on image data and the annexed image data,
    wherein the annexed image data is obtained by converting the annexed data to have a same format as that of the image data,
    wherein the annexed data is annexed to the image data, and wherein the annexed image data obtainer is configured to obtain, from the annexed data, user authentication information indicating users who are authorized to access the annexed data, determine whether a multimedia reproduction apparatus including the image decoding apparatus is allowed to use the annexed data based on the user authentication information, and, in response to the multimedia reproduction apparatus being allowed to use the annexed data, obtain the annexed data.

13. An image encoding method comprising:
obtaining annexed data that is annexed to image data and that is to be transmitted along with the image data;
determining how many bits in the annexed data are expressed on a basis of a pixel unit, based on transmission channel environment;
determining a plurality of fixed pixel values based on the determination of how many bits in the annexed data are expressed on the basis of a pixel unit;
obtaining annexed image data by allocating a fixed pixel value from among the plurality of fixed pixel values, which corresponds to at least one bit in the annexed data, to each pixel of the annexed image data; and
obtaining transmission image data based on the annexed image data and the image data and encoding the transmission image data according to a first codec.

14. The image encoding method of claim 13, wherein the annexed data comprises image processing data configured to convert the image data,
the image encoding method further comprising: processing the image data according to the image processing data.

15. The image encoding method of claim 13, wherein the obtaining the annexed data comprises: obtaining the annexed data from an image file including the image data.

16. The image encoding method of claim 15,
wherein when the image data of the image file and the annexed data are encoded in the first codec, the obtaining the annexed data comprises obtaining the annexed data by decoding, in the first codec, the annexed data encoded in the first codec, and
wherein the encoding comprises: encoding the transmission image data by encoding, in the first codec, a part of the transmission image data corresponding to the annexed image data that is not encoded in the first codec.

17. The image encoding method of claim 15, further comprising: in response to the image data of the image file and the annexed data being encoded in a second codec, decoding the image data and the annexed data in the second codec.

18. The image encoding method of claim 13, wherein the obtaining the annexed data comprises: obtaining the annexed data including at least one from among an annexed data identifier inserted into the annexed data and annexed image conversion information regarding a method of converting the annexed data into the annexed image data in order to distinguish the annexed data from the image data.

19. The image encoding method of claim 13, wherein the obtaining the annexed data comprises: obtaining the annexed data from at least one of encoding data obtained during an encoding process and user data obtained based on a user input.

20. The image encoding method of claim 13, wherein, in response to there being an image size limitation of the transmission image data, the obtaining the transmission image data comprises: compressing the annexed data according to the image size limitation, converting the compressed annexed data, and obtaining the annexed image data.

21. The image encoding method of claim 13, wherein the obtaining the annexed data comprises: obtaining user authentication information indicating users who are authorized to access the annexed data.

22. A non-transitory computer readable recording device having recorded thereon a computer program, which, when executed by a computer, performs the image encoding method of claim 13.

23. The image encoding method of claim 13, further comprising:
determining a predetermined insertion sequence selected from among a plurality of insertion sequences comprising a pixel unit insertion sequence and a specific block size unit insertion sequence.

24. The image encoding method of claim 23, wherein each of the plurality of insertion sequences has at least one predetermined direction in which the annexed data is inserted.

25. The image encoding method of claim 24, wherein the predetermined insertion sequence is alternated between blocks in which the annexed data is inserted.

26. The image encoding method of claim 13, wherein, when transmission data is obtained in a pixel domain, encoding entire said transmission image data and wherein, when the transmission data is obtained in a transform domain, only the image data is encoded according to the first codec and the encoded image data and the annexed image data is encoded according to a second codec.

27. An image decoding method comprising:
receiving a bitstream comprising encoded transmission image data encoded in a first codec;
obtaining transmission image data by decoding the encoded transmission image data in the first codec and obtaining annexed image data from the transmission image data;
obtaining annexed data by converting the obtained annexed image data, wherein the annexed data comprises image processing information configured to convert to the image data; and
obtaining image data from the transmission image data and reconstruct an image file by using the image data and the annexed data,
wherein the annexed data is obtained by converting pixels of the annexed image data into bits of the annexed data,
the annexed image data have a same format as that of the image data, and a number of bits in the annexed data which are expressed by one pixel of the annexed image data is determined based on transmission channel environment, and
wherein the annexed data is annexed to the image data.

28. The image decoding method of claim 27, wherein the image decoding method further comprising: processing the image data according to the image processing information.

29. A non-transitory computer readable recording device having recorded thereon a computer program, which, when executed by a computer, performs the image decoding method of claim 27.

30. An image decoding method comprising:
receiving a bitstream comprising encoded transmission image data encoded in a first codec;
obtaining transmission image data by decoding the encoded transmission image data in the first codec and obtaining annexed image data from the transmission image data; and obtaining annexed data by converting the obtained annexed image data, wherein the transmission image data is obtained based on image data and the annexed image data, wherein the annexed image data is obtained by converting the annexed data to have a same format as that of the image data, wherein the annexed data is annexed to the image data, and wherein the obtaining the annexed data comprises:
- obtaining user authentication information indicating users who are authorized to access the annexed data from the annexed data;
- determining whether a multimedia reproduction apparatus is allowed to use the annexed data based on the user authentication information; and
- in response to the multimedia reproduction apparatus being allowed to use the annexed data, obtaining the annexed data.

* * * * *